(12) United States Patent
Ikeda

(10) Patent No.: US 10,565,072 B2
(45) Date of Patent: Feb. 18, 2020

(54) SIGNAL PROCESSING DEVICE, SIGNAL PROCESSING METHOD, AND PROGRAM

(71) Applicant: Sony Corporation, Tokyo (JP)

(72) Inventor: Noritaka Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/077,615

(22) PCT Filed: Feb. 10, 2017

(86) PCT No.: PCT/JP2017/004955
§ 371 (c)(1),
(2) Date: Aug. 13, 2018

(87) PCT Pub. No.: WO2017/145818
PCT Pub. Date: Aug. 31, 2017

(65) Prior Publication Data
US 2019/0073278 A1 Mar. 7, 2019

(30) Foreign Application Priority Data
Feb. 24, 2016 (JP) .................... 2016-032983

(51) Int. Cl.
*G06F 11/16* (2006.01)
*G06T 9/00* (2006.01)
*G06F 11/07* (2006.01)

(52) U.S. Cl.
CPC ........ *G06F 11/165* (2013.01); *G06F 11/0733* (2013.01); *G06T 9/007* (2013.01)

(58) Field of Classification Search
CPC ..... G06F 11/165; G06F 11/0733; G06T 9/007
See application file for complete search history.

(56) References Cited

U.S. PATENT DOCUMENTS 10,416,910 B1 * 9/2019 Lai .................... G06F 1/324
2014/0331099 A1 * 11/2014 Wong ............... G01R 31/31854
714/733

(Continued)

FOREIGN PATENT DOCUMENTS

| JP | 2009-111546 A | 5/2009 |
|----|---------------|--------|
| JP | 2009-169141 A | 7/2009 |
| JP | 2009-246803 A | 10/2009 |

OTHER PUBLICATIONS

International Search Report and English translation thereof dated Apr. 11, 2017 in connection with International Application No. PCT/JP2017/004955.

(Continued)

*Primary Examiner* — Kyle Vallecillo
(74) *Attorney, Agent, or Firm* — Wolf, Greenfield & Sacks, P.C.

(57) ABSTRACT

The present disclosure relates to a signal processing device, a signal processing method, and a program that enable detection of a failure without stopping signal processing. A toggle rate is calculated for each of signals of a preceding stage and a subsequent stage of a signal processing unit and, in a case where a difference therebetween is larger than a predetermined threshold value, it is assumed that an error caused by a failure is occurring in the signal processing unit. The present disclosure can be applied to a drive assistance device of a vehicle.

11 Claims, 12 Drawing Sheets

(56) References Cited

U.S. PATENT DOCUMENTS

2015/0356229 A1* 12/2015 Siu .................... G06F 17/5081
                                                                716/115
2016/0275851 A1*  9/2016 Choi ................... G09G 3/2092
2017/0031853 A1*  2/2017 Sadowski ............ G06F 13/362

OTHER PUBLICATIONS

International Written Opinion dated Apr. 11, 2017 in connection with International Application No. PCT/JP2017/004955, and English translation thereof.

International Preliminary Report on Patentability dated Sep. 7, 2018 in connection with International Application No. PCT/JP2017/004955, and English translation thereof.

* cited by examiner

SIGNAL PROCESSING DEVICE, SIGNAL PROCESSING METHOD, AND PROGRAM

CROSS REFERENCE TO RELATED APPLICATIONS

This is a U.S. National Stage Application under 35 U.S.C. § 371, based on International Application No. PCT/JP2017/004955, filed Feb. 10, 2017, which claims priority to Japanese Patent Application JP 2016-032983, filed Feb. 24, 2016, each of which is hereby incorporated by reference in its entirety.

TECHNICAL FIELD

The present disclosure relates to signal processing devices, signal processing methods, and programs and particularly to a signal processing device, a signal processing method, and a program that enable detection of a failure without stopping signal processing.

BACKGROUND ART

In a signal processing device including a plurality of signal processing units for performing signal processing including image signals, audio signals, and other signals, in order to detect whether a failure has occurred in any one of the signal processing units, generally it is necessary to stop signal processing, to allow a known signal such as a test pattern to be processed, and to make determination on the basis of whether a known processing result is output.

More specifically, generally in order to discriminate a failure in a circuit that continues signal processing, a technology for detecting whether there is a failure by first stopping image output, feeding a test pattern, and comparing with an expected value prepared in advance is proposed (see Patent Document 1).

Also proposed is a technology for detecting whether there is a failure by inserting a test image during a blank period and comparing with an expected value (see Patent Document 2).

CITATION LIST

Patent Document

Patent Document 1: Japanese Patent Application Laid-Open No. 2009-246803
Patent Document 2: Japanese Patent Application Laid-Open No. 2009-111546

SUMMARY OF THE INVENTION

Problems to be Solved by the Invention

However, in the technologies of Patent Documents 1 and 2, it is necessary to first stop signal processing to detect a failure.

In addition, it is necessary to activate all the circuits in order to detect all failures, and this cannot be performed unless many test images or parameters are prepared and a test is thereby executed. In the related art, however, it is only possible to detect whether there is a failure in some circuits that are activated by specific current data (dependent on a test image) or by an arithmetic operation parameter that is uniquely set.

The present disclosure has been made in view of such circumstances and enables implementation of detection of a failure in a signal processing device without using specific current data (dependent on a test image) or an arithmetic operation parameter that is uniquely set.

Solutions to Problems

A signal processing device according to an aspect of the present disclosure includes: a signal processing unit for sequentially processing input signals of digital signals; a first toggle rate calculating unit for calculating a toggle rate of each of the input signals as a first toggle rate; a second toggle rate calculating unit for calculating a toggle rate of a signal processed by the signal processing unit as a second toggle rate; and an error detecting unit for comparing a difference between the first toggle rate and the second toggle rate with a predetermined threshold value and detecting occurrence of an error depending on the comparison result.

Both the first toggle rate calculating unit and the second toggle rate calculating unit may be caused to calculate, as the toggle rate, an average of ratios of the number of times of change of numerical values of respective digits of each of the digital signals for a predetermined number of clocks, the average being for all the digits.

Each of the input signals may be an image signal of binary data, and the first toggle rate calculating unit and the second toggle rate calculating unit may be both caused to calculate an average value of toggle rates of respective bits for one frame as an average toggle rate of a preceding stage and an average toggle rate of a subsequent stage, respectively, of the signal processing unit.

Each of the input signals may be an image signal of binary data, and the first toggle rate calculating unit and the second toggle rate calculating unit may be both caused to calculate an average value of toggle rates of respective bits for one frame and further calculates an average value for all the bits as an average toggle rate of a preceding stage and an average toggle rate of a subsequent stage, respectively, of the signal processing unit.

Each of the input signals may be an image signal of binary data, and the error detecting unit is caused to detect occurrence of an error in the signal processing unit in a case where the difference between the first toggle rate and the second toggle rate is greater than an error threshold value which is a first threshold value.

A plurality of stages of signal processing units is connected in series, a toggle rate calculating unit is further provided between each pair of the signal processing units, a toggle rate calculating unit in a preceding stage of each of the signal processing unit corresponds to the first toggle rate calculating unit while a toggle rate calculating unit in a subsequent stage of the signal processing unit corresponds to the second toggle rate calculating unit, and the error detecting unit may be caused to detect, for each of the plurality of signal processing units, occurrence of an error in the signal processing unit in a case where the difference between the first toggle rate and the second toggle rate is greater than the error threshold value and, when the occurrence of the error in the signal processing unit is detected, to notify a stage number of the signal processing unit in which the error has been detected.

A first toggle rate calculating unit in a foremost stage may be caused to calculate a toggle rate of each of the input signals as an input toggle rate, and the error detecting unit may be caused to set the error threshold value to a second threshold value smaller than the first threshold value in a case where the input toggle rate is smaller than a predetermined threshold value, to detect, for each of the plurality of signal processing units, occurrence of an error in the signal processing unit when the difference between the first toggle rate and the second toggle rate is greater than the error threshold value, and when the occurrence of the error in the signal processing unit is detected, to notify a stage number of the signal processing unit in which the error has been detected.

A plurality of imaging units for capturing the image signal may be further included. A plurality of stages of signal processing units is included in each of the plurality of imaging units, a plurality of stages of signal processing units is connected in series, the toggle rate calculating unit is further provided between each pair of the signal processing units, a toggle rate calculating unit in a preceding stage of each of the signal processing units corresponds to the first toggle rate calculating unit while a toggle rate calculating unit in a subsequent stage of the signal processing unit corresponds to the second toggle rate calculating unit, and the error detecting unit may be caused to set the error threshold value to a second threshold value smaller than the first threshold value in a case where the input toggle rate is smaller than a predetermined threshold value, to detect, for each of the plurality of signal processing units, occurrence of an error in the signal processing unit when the difference between the first toggle rate and the second toggle rate is greater than the error threshold value and when a difference between the second toggle rates of the respective imaging units in a last stage of the plurality of signal processing units is larger than a predetermined threshold value, and when the occurrence of the error in the signal processing unit is detected, to notify a stage number of the signal processing unit in which the error has been detected.

Further included are: an assistance unit for assisting driving by controlling operation of a driving part included in a vehicle on the basis of the signal processing result of the signal processing unit; and a display unit for displaying control information of the vehicle. In a case where an error is detected by the error detecting unit, the assistance unit can be caused to stop the assisting of driving by controlling the operation of the driving part included in the vehicle based on the signal processing result of the signal processing unit.

A signal processing method according to an aspect of the present technology includes the steps of: sequentially processing input signals of digital signals; calculating a toggle rate of each of the input signals as a first toggle rate; calculating a toggle rate of a signal processed by the signal processing unit as a second toggle rate; and detecting occurrence of an error depending on a comparison result obtained by comparing a difference between the first toggle rate and the second toggle rate with a predetermined threshold value.

A program according to an aspect of the present technology is a program for causing a computer to function as: a signal processing unit for sequentially processing input signals of digital signals; a first toggle rate calculating unit for calculating a toggle rate of each of the input signals as a first toggle rate; a second toggle rate calculating unit for calculating a toggle rate of a signal processed by the signal processing unit as a second toggle rate; and an error detecting unit for comparing a difference between the first toggle rate and the second toggle rate with a predetermined threshold value and detecting occurrence of an error depending on the comparison result.

In one aspect of the present disclosure, sequential processing is performed by input signals of digital signals, a toggle rate of each of the input signals is calculated as a first toggle rate, a toggle rate of a signal processed is calculated as a second toggle rate, and occurrence of an error is detected depending on a comparison result obtained by comparing a difference between the first toggle rate and the second toggle rate with a predetermined threshold value.

Effects of the Invention

According to one aspect of the present disclosure, it is possible to implement detection of a failure in a signal processing device without using specific current data (dependent on a test image) or an arithmetic operation parameter that is uniquely set.

MODE FOR CARRYING OUT THE INVENTION

Preferred embodiments of the present disclosure will be described in detail below with reference to the accompanying drawings. Note that in the present specification and the drawings, components having substantially the same functional configuration are denoted by the same symbol, thereby omitting redundant explanations.

In addition, explanation will be given in the following order.
1. First Embodiment
2. Variation
3. Second Embodiment
4. First Application Example
5. Second Application Example

1. First Embodiment

<First Configuration Example of an in-Vehicle Camera System to which a Signal Processing Device of the Present Disclosure is Applied>

Figure 1:
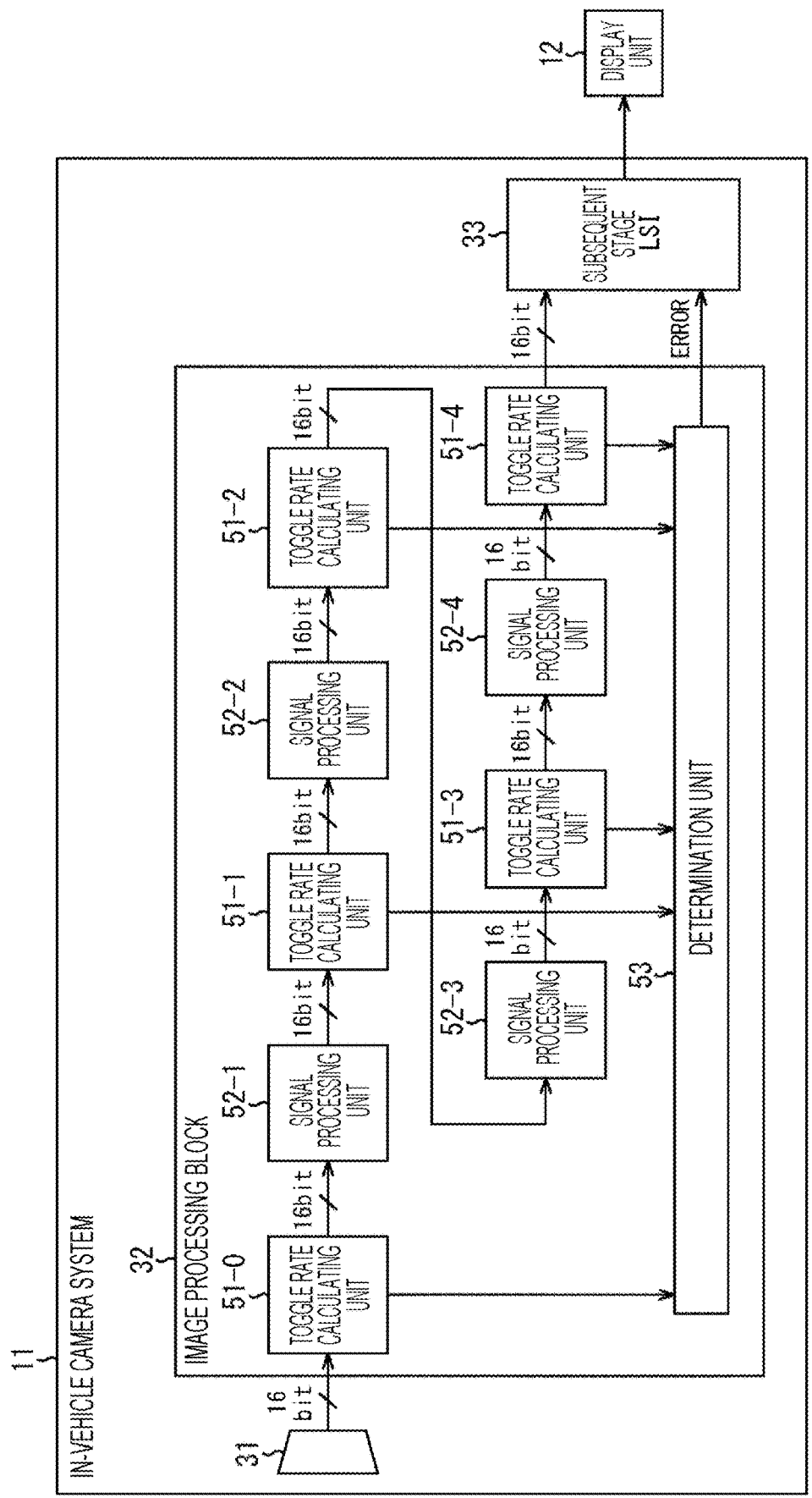
FIG. 1 is a diagram illustrating a configuration example of an in-vehicle camera system to which the present disclosure is applied.

FIG. 1 is a diagram illustrating a first configuration example of an in-vehicle camera system to which a signal processing device of the present disclosure is applied.

The in-vehicle camera system in FIG. 1 assists driving of a vehicle by performing signal processing on an image captured by an image sensor mounted on, for example, each of a front window, a rear window, side windows, etc. of the vehicle and controlling the operation of the steering wheel, the brake, lights, etc. of the vehicle on the basis of the result of the signal processing.

However, in a case where some error occurs in the signal processing result due to a failure of the in-vehicle camera system or other reasons, controlling the steering wheel, the braking, lights, etc. on the basis of such signal processing results may result in a dangerous situation in the behavior of the vehicle.

Therefore, in a case where an error is detected in signal processing, the in-vehicle camera system encourages to perform driving according to a driver's will by stopping driving assist based on the signal processing results and promptly notifying the driver who is the user that the driving assist by the in-vehicle camera system has been stopped.

More specifically, the in-vehicle camera system 11 of FIG. 1 includes an image sensor 31, an image processing block 32, and a subsequent stage LSI 33 and outputs a processing result to a display unit 12.

The image sensor 31 includes a complementary metal oxide semiconductor (CMOS) or the like and captures images ahead of, in the back of, and in side directions of a vehicle on which the in-vehicle camera system 11 is mounted and outputs, for example, an image including pixel signals of 16 bits to the image processing block 32. Note that the number of bits of pixel signals may be a number other than sixteen and may be 12 bits, 10 bits, or other numbers. Here, descriptions are given assuming 16 bits as an example.

The image processing block 32 performs signal processing on the image including pixel signals of 16 bits captured by the image sensor 31 and outputs the signal processing result to the subsequent stage LSI 33. Note that an example in which the image processing block 32 performs signal processing on pixel signals of 16 bits and outputs as pixel signals of 16 bits as well is described here an example; however, this is merely an example, and pixel signals of 16 bits may be subjected to signal processing and be output as pixel signals of another number of bits such as 12 bits or 20 bits.

The image processing block 32 includes toggle rate calculating units 51-0 to 51-4, signal processing units 52-1 to 52-4, and a determination unit 53.

The toggle rate calculating unit 51-0 calculates an average toggle rate for each frame for each of the pixel signals of 16 bits forming the image which is an input signal in a preceding stage of the signal processing unit 52-1 and supplies the result to the determination unit 53.

Here, a toggle rate is an activation rate representing changes from 0 to 1 and from 1 to 0 in respective bits of pixel signals. In a case where a toggle rate is greater than or equal to a predetermined rate, this shows that an input image is a natural image. That is, in the case of an image including black pixels on the entire surface or the like, for example, since values of respective bits of pixel signals are all the same in the order of raster scanning, an average toggle rate of the respective bits as the pixel signals is substantially zero.

Furthermore, the toggle rate calculating units 51-1 to 51-4 basically perform similar processing to that of the toggle rate calculating unit 51-0 but calculate a toggle rate of a subsequent stage of the signal processing units 52-1 to 52-4, respectively.

Note that the toggle rate calculating units 51-0 to 51-4 and the signal processing units 52-1 to 52-4 are simply referred to as the toggle rate calculating units 51 and the signal processing units 52 in a case where there is no need to specifically distinguish.

Furthermore, the toggle rate calculating unit 51-0 is provided in a preceding stage of the signal processing unit 52-1 and is hereinafter also referred to as the 0th stage toggle rate calculating unit 51. Furthermore, the signal processing units 52-1 to 52-4 are also referred to as the first to the fourth stage signal processing units 52, respectively. The toggle rate calculating units 51-1 to 51-4 are also referred to as the first stage to the fourth stage toggle rate calculating units 51 in subsequent stages of the first stage to the fourth stage signal processing units 52, respectively.

More specifically, the toggle rate calculating unit 51-0 reads each pixel signal in an input image, for example, in the order of raster scanning, calculates a toggle rate of each of pixel signals of 16 bits, and calculates an average of the toggle rates as an average toggle rate.

Figure 2:
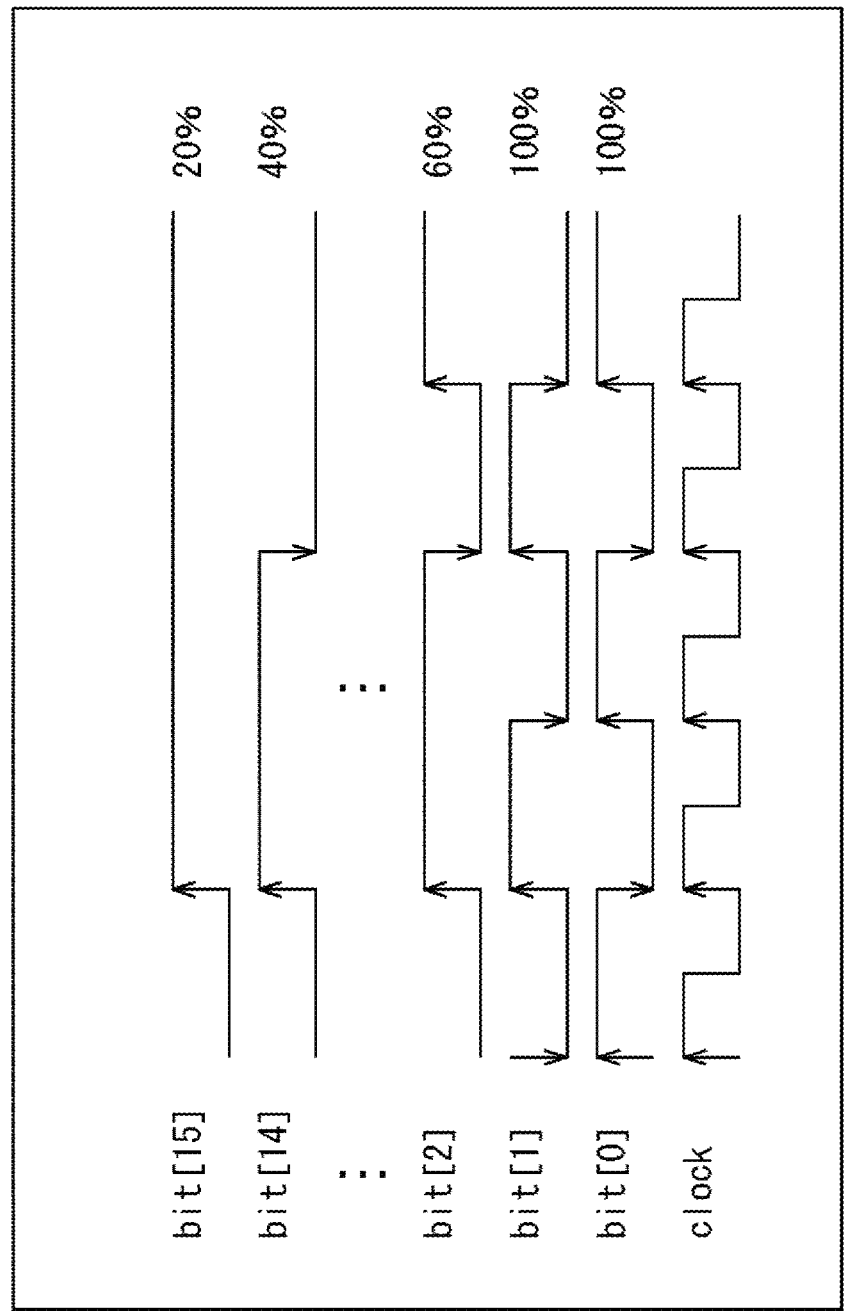
FIG. 2 is a diagram for explaining an average toggle rate of all bits.

More specifically, for example, when pixel signals of 16 bits as illustrated in FIG. 2 are read out in the order of raster scanning, the toggle rate calculating unit 51 calculates a toggle rate of each of the bits. In FIG. 2, in synchronization with a clock signal of the lowest row, time series changes of pixel signals of 16 bits denoted as bit [15] to bit [0] are illustrated from the top, and toggle rates for five clocks are illustrated.

In FIG. 2, for example for bit [15] which is a signal of the 16th bit, there is one time of change from 0 to 1, and thus the toggle rate calculating unit 51 is 20%. For bit [14], there are a total of two times of changes including one time of change from 0 to 1 and another time of change from 1 to 0, and thus the toggle rate is 40%.

In addition, as for the bit [2], there are a total of three times of changes including two times of changes from 0 to 1 and one time of change from 1 to 0, and thus the toggle rate is 60%. For bit [1], there are a total of five times of changes which are two times of changes from 0 to 1 and three times of changes from 1 to 0, and thus the toggle rate is 100%. For bit [0], there are a total of five times of changes including three times of changes from 0 to 1 and two times of changes from 1 to 0, and thus the toggle rate is 100%.

That is, a toggle rate referred to here is a ratio of the number of times that a numerical value of each bit (each digit) changes for a predetermined number of clocks. Note that in this case, since digital signals including binary data is targeted, the number of times of changes in the numerical value of each of the bits with respect to a predetermined number of clocks, that is, a ratio of the number of times of changes in the numerical value of each digit is obtained as a toggle rate. Therefore, it is possible to define, as a toggle rate, a ratio of the number of times of changes in the numerical value in each digit for a predetermined number of clocks even for digital signals using expressions other than binary data, that is, binary numbers.

The toggle rate calculating unit 51 calculates, as an average toggle rate, an average value of toggle rates of 16 bits for one frame obtained in this manner.

The determination unit 53 determines in which one of the signal processing units 52-1 to 52-4 an error caused by a failure or the like is occurring on the basis of the toggle rates supplied from the toggle rate calculating units 51-0 to 51-4 and notifies the determination result to the subsequent stage LSI 33.

The subsequent stage large scale integrated circuit (LSI) 33 assists driving by a driver by controlling operations of the steering wheel, the brake, lights, etc. of the vehicle (not illustrated) on the basis of the image processing result (signal processing result) of the image processing block 32 and also outputs and displays information corresponding to the signal processing result to and on the display unit 12 including an instrument panel or the like.

More specifically, in a case where information indicating that abnormality is occurring in one of the signal processing units 52-1 to 52-4 is supplied from the image processing block 32, the subsequent stage LSI 33 controls the operation of the steering wheel, the brake, lights, etc. of the vehicle (not illustrated) using the processing result of the image processing block 32, thereby stops the assistance of driving by the driver, and displays as so on the display unit 12 such that the driver can recognize so.

That is, in a case where average toggle rates for each of frames of the image in the subsequent stages of the signal processing units 52-1 to 52-4 are maintained larger than or equal to a predetermined value, the signal processing units 52-1 to 52-4 can be assumed as normally functioning. Conversely, in a case where an error occurs in any one of the signal processing units 52-1 to 52-4, an average toggle rate in the signal processing units 52-1 to 52-4 changes greatly. For example in a state where image signals in the subsequent stage give an image in the same color such as a black image, average toggle rates in the signal processing units 52-1 to 52-4 after the subsequent stage do not change and stay at a value substantially equivalent to 0.

Therefore, of the average toggle rates which are the calculation results of the toggle rate calculating units 51-0 to 51-4, the determination unit 53 compares that of a preceding stage and a subsequent stage of each of the signal processing units 52-1 to 52-4 and specifies in which signal processing unit 52 a failure has occurred and an error is occurring. In a case where an error is occurring, this information is output to the subsequent stage LSI 33.

In addition, as for a toggle rate of the toggle rate calculating unit 51-0, in a case where abnormality has occurred in the input image itself, that is, for example in a case where the entire image is a black, a change in the toggle rate for each frame cannot be expected thereafter, and thus there is a possibility that occurrence of abnormality cannot be detected. Therefore, in such a case, the determination unit 53 assumes that no abnormality has occurred regardless of the comparison result of toggle rates in a preceding and subsequent stages of each of the signal processing units 52-1 to 52-4. That is, in this case, it is abnormality of the input image and is not regarded as abnormality of the signal processing units 52-1 to 52-4.

<Error Determination Processing Using Average Toggle Rate of all Bits by in-Vehicle Camera System of FIG. 1>

Figure 3:
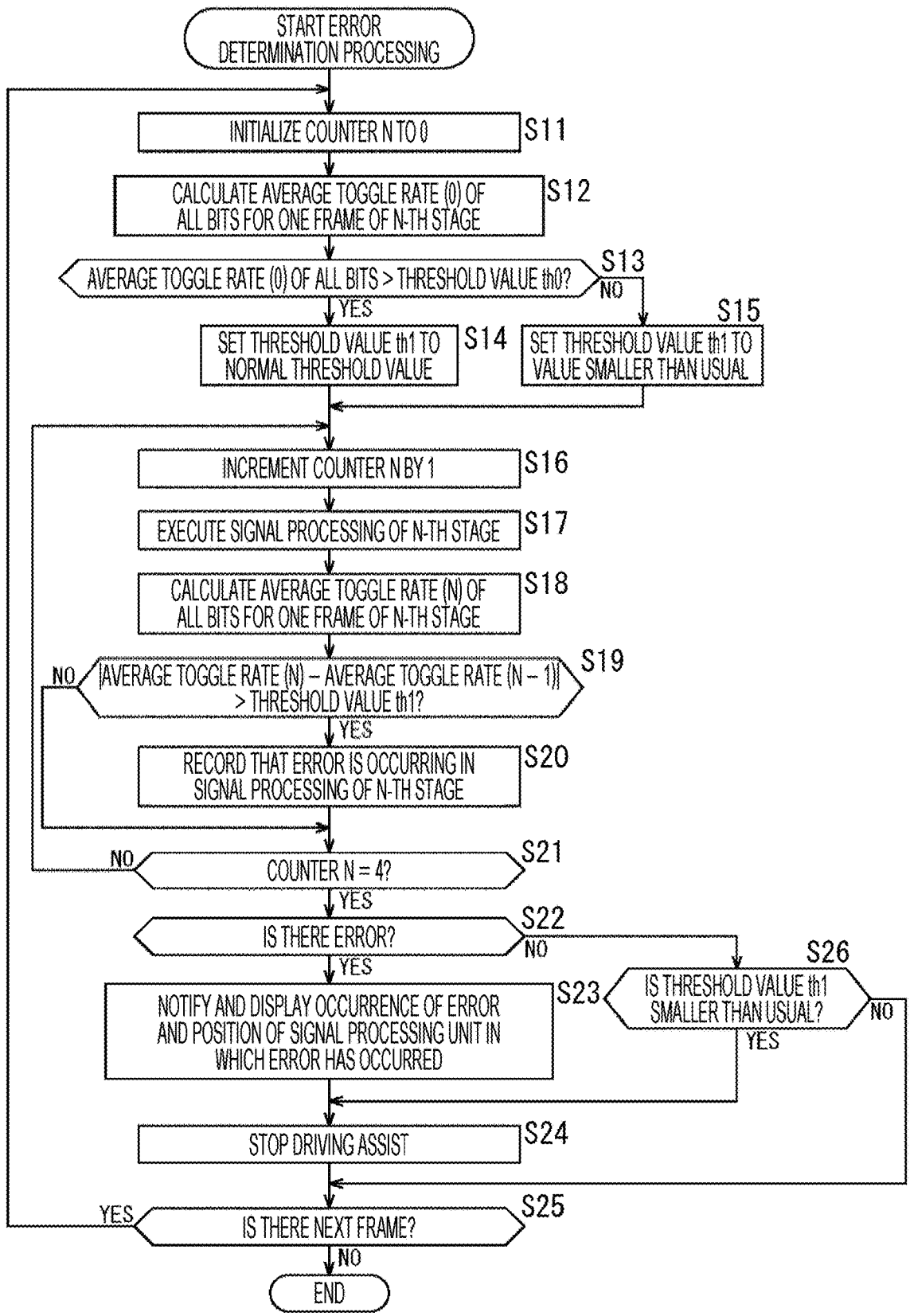
FIG. 3 is a flowchart for explaining error determination processing in the in-vehicle camera system of FIG. 1.

Next, error determination processing using the average toggle rate of all bits by the in-vehicle camera system of FIG. 1 will be described with reference to a flowchart of FIG. 3.

In step S11, the determination unit 53 initializes a counter N for distinguishing a stage number of the toggle rate calculating unit 51-N and the signal processing unit 52-N to 0. Note that, since there is no signal processing unit 52 in the zeroth stage, in a case where the counter N is 0, only the toggle rate calculating unit 51-0 is set.

In step S12, the toggle rate calculating unit 51-N (51-0) of the Nth stage calculates an average toggle rate (N) of all bits of pixel signals for one frame included in the input image and outputs the calculation result to the determination unit 53 and also sequentially outputs the pixel signals of the input image to the signal processing unit 52-1. That is, here, the average toggle rate (0) of an image of one frame before signal processing on the input image is calculated. More specifically, an average toggle rate of a first bit in the pixel signals of each pixel in the order of raster scanning, an average toggle rate of a second bit, . . . an average toggle rate of a 16th bit are obtained, and an average of the average toggle rates of these bits is calculated as the average toggle rate (0) for one frame of the input image.

In step S13, the determination unit 53 determines whether the average toggle rate (0) is higher than a predetermined threshold value th0. That is, here, by the threshold value th0 it is determined by this processing whether there is a change among respective pixels of the input image and whether some type of an error image including substantially uniform pixel values over the entire image such as a black image or a gray image has been input. In step S13, if the average toggle rate (0) is higher than the predetermined threshold value th0 and normal images are being supplied, the processing proceeds to step S14.

In step S14, the determination unit 53 sets a threshold value th1 for detecting abnormality in a difference between average toggle rates of a preceding and a subsequent stages of each of the subsequent signal processing units 52 to a normal threshold value.

Note that, as for the threshold value th1 set here, it is desirable that an appropriate value is set depending on a characteristic of the current pixel signals subjected to signal processing. In other words, if the threshold value th1 is unnecessarily too high, it is difficult to appropriately detect an error even when the error occurs. On the contrary, if the threshold value th1 is too low, there are cases where an error is erroneously detected even when no error has occurred, and thus it is desirable to employ a method such as setting a statistically appropriate value, for example.

On the other hand, in step S13 if the average toggle rate (0) is smaller than the predetermined threshold value th0 and it is assumed that some type of an error image including substantially uniform pixel values over the entire image such as a black image or a gray image has been input as the input image, the processing proceeds to step S15.

In step S15, the determination unit 53 sets the threshold value th1 for detecting abnormality in a difference between average toggle rates of a preceding and a subsequent stages of each of the subsequent signal processing units 52 to a value substantially lower than a normal threshold value. In other words, there is a high possibility that the input image is an error image, thus there is a possibility that similar images will be input thereafter, and even when there is no change in average toggle rates (N) of a preceding and a subsequent stages of each of the subsequent signal processing units 52-1 to 52-4, there is a possibility that no abnormality has occurred in the signal processing units 52-1 to 52-4. Therefore, the threshold value th1 is set to be sufficiently small such that it is assumed that no abnormality has occurred even in a case where there is no change.

In step S16, the determination unit 53 increments, by one, the counter N for distinguishing stage numbers of the toggle rate calculating unit 51-N and the signal processing unit 52-N.

In step S17, the signal processing unit 52-N of an Nth stage executes signal processing of the Nth stage and outputs the result to the toggle rate calculating unit 51-N in the subsequent stage.

In step S18, the toggle rate calculating unit 51-N calculates the average toggle rate (N) of all bits for one frame in the signal processing result of the signal processing unit 52-N of the Nth stage and outputs the calculation result to the determination unit 53.

In step S19, the determination unit 53 determines whether an absolute value of a difference between the average toggle rate (N) in a subsequent stage of the signal processing unit 52-N of the Nth stage and an average toggle rate (N−1) of a preceding stage is larger than the predetermined threshold value th1.

In step S19, for example, if the absolute value of the difference between the average toggle rate (N−1) and the average toggle rate (N) is larger than the predetermined threshold value th1, there is a large change in the average toggle rate, and it is assumed that there is an error in the signal processing unit 52-N of the Nth stage, the processing proceeds to step S20.

In step S20, the determination unit 53 stores that an error is occurring in the signal processing unit 52-N of the Nth stage.

On the other hand, in step S19 for example if the absolute value of the difference between the average toggle rate (N−1) and the average toggle rate (N) is smaller than the predetermined threshold value th1, there is no large change in the average toggle rate, and it is assumed that there is no error in the signal processing unit 52-N of the Nth stage, the processing of step S20 is skipped.

In step S21, the determination unit 53 confirms whether the counter N for distinguishing the toggle rate calculating units 51-N and the signal processing units 52-N is 4, that is, whether it has been confirmed whether there is an error in the signal processing units 52 of all the four stages. In step S21, if the counter N is not 4, the processing returns to step S16, and the processing of steps S16 to S21 is repeated until the counter N reaches 4, that is, until whether an error is occurring is confirmed for all the signal processing units 52-1 to 52-4.

Then, if whether an error is occurring is confirmed for all the signal processing units 52-1 to 52-4 and it is assumed that the counter N has reached 4, the processing proceeds to step S22.

In step S22, the determination unit 53 determines whether an error is occurring in the signal processing units 52-1 to 52-4. If an error is occurring, the processing proceeds to step S23.

In step S23, the determination unit 53 outputs information for specifying a signal processing unit 52 in which the error is occurring to the subsequent stage LSI 33.

By this processing, the subsequent stage LSI 33 displays, on the display unit 12, the information specifying the signal processing unit 52 together with the information indicating that the error is occurring, and the processing proceeds to step S24.

In step S24, the subsequent stage LSI 33 stops the driving assist by controlling the operation of the steering wheel, the brake, lights, etc. of the vehicle not illustrated using the processing results of the signal processing units 52-1 to 52-4 and displays so on the display unit 12 such that the driver can recognize so, and the processing proceeds to step S25.

On the other hand, if it is assumed in step S22 that no error is occurring, the processing proceeds to step S26.

In step S26, the determination unit 53 determines whether the threshold value th1 is set to be smaller than usual, that is, whether an error of the input image has occurred. In step S26, if the threshold value th1 is set to be smaller than usual, and the input image is for example a black image or the like, and thus appropriate image processing is difficult, the processing proceeds to step S24.

That is, in this case, since the input image is a black image or the like, it cannot be determined whether an error or the like is occurring in the signal processing units 52-1 to 52-4. However, as for driving assist using signal processing results of the signal processing units 52-1 to 52-4, this may not be executed properly, and thus only the driving assist is stopped, and only that fact is displayed on the display unit 12.

On the other hand, if in step S26 the threshold value th1 is not set to be smaller than usual with a normal state in which processing can be appropriately performed, the processing proceeds to step S25.

In other words, in this case, since the input image is not a black image or the like, and it is assumed that there is no error, the subsequent stage LSI 33 continues to assist driving of the driver by controlling the operation of the steering wheel, the brake, lights, etc. of the vehicle not illustrated on the basis of respective signal processing results of the signal processing units 52-1 to 52-4.

In step S25, the determination unit 53 determines whether a next image, that is, a next frame is input. If the next frame is input, the processing returns to step S11, and the subsequent processing is repeated. Then, if no next frame is input in step S25, the processing is terminated.

Figure 4:
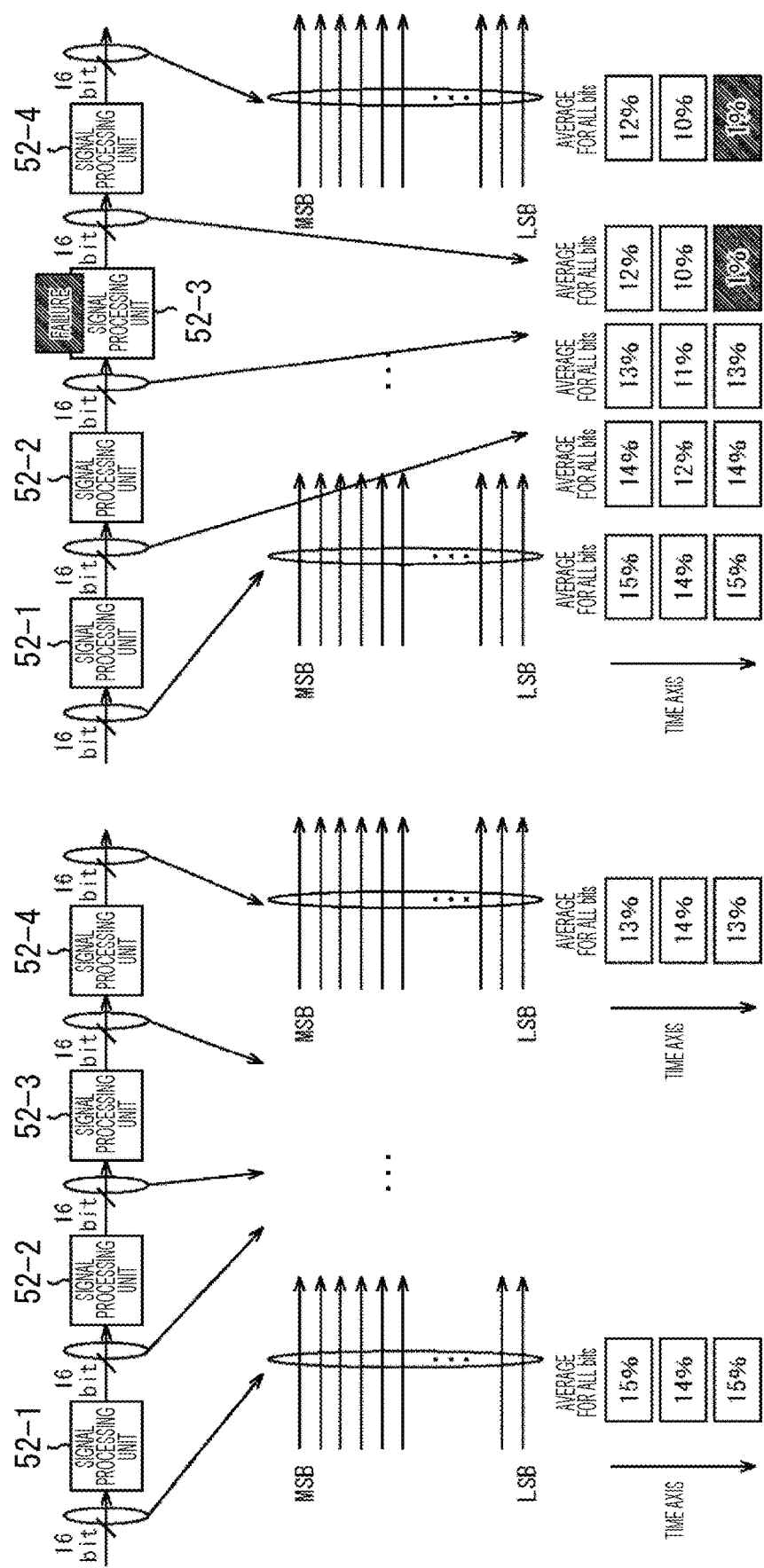
FIG. 4 is a diagram for explaining the error determination processing in the in-vehicle camera system of FIG. 1.

As a result of the above processing, for example as illustrated in the left part of FIG. 4, the average toggle rate (0) calculated by the toggle rate calculating unit 51-0 in the preceding stage of the signal processing unit 52-1 changes from the top in time series of 15%, 14%, and 15%, it is assumed that a normal image has been input, and the threshold value th1 is set to the normal threshold value. As a result, for example in a case where the average toggle rate (4) in the subsequent stage of the signal processing unit 52-4 which is the fourth stage illustrated in FIG. 2 changes in time series of 13%, 14%, and 13%, it is assumed that a normal signal processing result is not output, and no error is detected.

On the other hand, as illustrated in the right part of FIG. 4, in a case where the toggle rate (0) in the 0th stage changes in time series of 15%, 14%, and 15%, the toggle rate (1) in the first stage changes in time series of 14%, 12%, and 14%, the toggle rate (2) in the second stage changes in time series of 13%, 11%, and 13%, the toggle rate (3) in the third stage changes in time series of 12%, 10%, and 1%, and the toggle rate (4) in the fourth stage changes in time series of 12%, 10%, and 1%, with an error occurring in the signal processing unit 52-3 at the third timing, the average toggle rate also decreases in the signal processing unit 52-4.

As a result, in such a case, it is notified that an error is occurring in the signal processing unit 52-3 at the third timing of the time series in the right part of FIG. 4, and the signal processing results are not used thereafter.

Note that, although not illustrated, in a case where the input image is a black image, the average toggle rate (0) of the input image is approximately 0, and as a matter of course an absolute value of the difference between the average toggle rate (N−1) and the average toggle rate (N) also becomes substantially 0. In this case, even if an error or the like is occurring in any of the signal processing units 52-1 to 52-4, occurrence of an error or the like cannot be confirmed, and thus as for processing in this case, the driving assist by controlling the operation of the steering wheel, the brake, lights, etc. of the vehicle (not illustrated) based on the signal processing results is stopped, and this fact is displayed on the display unit 12 such that the driver can recognize it.

This processing allows the driver to recognize that the function for assisting driving corresponding to images has been stopped and to appropriately recognize that the driver has to focus on driving. Therefore, it is possible to reduce occurrence of accidents caused by insufficient awareness of a driver for driving due to sudden stop of the function to assist driving.

In addition, in the above processing, the example where the threshold value th1 is set as the same value for all of the signal processing units 52-N has been described. However, different values may be set depending on respective functions or the like of the signal processing units 52-N.

That is, since the signal processing units 52-N may separately perform such processing as to change the average toggle rate, it is desirable that the threshold value th1 is set to an appropriate value for each function of the signal processing units 52-N.

For example, in a case where a specific signal processing unit 52 has such a function as to perform multiplication like gain processing, there is a possibility that the average toggle rate tends to rise as compared to those of the other signal processing units 52. Conversely, for example, in such processing in which a specific signal processing unit 52 adjusts an image too bright to be darker, there is a possibility that the average toggle rate tends to decrease as compared to the other signal processing units 52.

Therefore, there is a possibility that average toggle rates of the signal processing units 52-N may separately exhibit different tendencies depending on a processing content, and thus the threshold value th1 may also be separately set.

For example, in place of the threshold value th1, a threshold value th11 (=threshold value th1×kN) may be set for each of the signal processing units 52-N. Here, kN is a block-specific coefficient. For example, by multiplying the threshold value th1 by the block-specific coefficient kN depending on the signal processing unit 52-N of the Nth stage, a threshold value th11 corresponding to the corrected threshold value th1 is set depending on the function or a characteristic of the signal processing unit 52-N. It is possible to detect whether there is a failure in the signal processing unit 52 with higher accuracy by setting the threshold value th11, which is the threshold value th1 corrected depending on a separate characteristic of a signal processing unit 52-N in this manner.

With the above processing, it is possible to implement detection of a failure in an image processing device for each signal processing unit in real time and without using specific current data (dependent on a test image) or an arithmetic operation parameter that is uniquely set.

In addition, in implementing the function of implementing driving assist using images, it is possible to detect occurrence of an error in real time, to suppress occurrence of malfunction in driving assist, and to appropriately present to the driver that driving assist has been stopped.

2. Variation

In the above description, an example has been described in which an average toggle rate of all bits of an image signal is obtained and whether an error is occurring in the N-th stage signal processing unit 52-N. However, an error may be detected with a higher accuracy by obtaining an average toggle rate for each bit and detecting whether there is an error for each bit of a signal processing unit 52-N.

Note that a basic configuration of the in-vehicle camera system in which an average toggle rate is obtained for each bit and whether there is occurrence of an error is detected for each bit of the signal processing unit 52-N is similar to that in FIG. 1, and thus descriptions thereon are omitted.

However, the toggle rate calculating units 51-0 to 51-4 calculate an average toggle rate for each bit of the image signal and supply the calculation results to the determination unit 53. The determination unit 53 calculates an average toggle rate for each bit of the image signal using the toggle rate calculating units 51-0 to 51-4 and determines whether there is an error in the signal processing units 52-1 to 52-4 for each bit.

<Error Determination Processing Using Average Toggle Rate for Each Bit by in-Vehicle Camera System of FIG. 1>

Next, error determination processing using an average toggle rate of each bit by the in-vehicle camera system of FIG. 1 will be described with reference to a flowchart of FIG. 5.

In step S51, the determination unit 53 initializes a counter N for distinguishing a stage number of the toggle rate calculating unit 51-N and the signal processing unit 52-N and a counter M for distinguishing a bit position in a pixel signal to 0. Note that, since there is no signal processing unit 52 in the zeroth stage, only the toggle rate calculating unit 51-0 is set here.

In step S52, the toggle rate calculating unit 51-N (51-0) of the Nth stage calculates an average toggle rate (N, M) of an M-th bit of each pixel signal for one frame included in an input image and outputs the calculation result to the determination unit 53 and also sequentially outputs the pixel signals of the input image to the signal processing unit 52-1. That is, here, the average toggle rate (N, M) (=(0, M)) of the M-th bit of an image of one frame before signal processing on the input image is calculated.

In step S53, the determination unit 53 determines whether the average toggle rate (N, M) is higher than a predetermined threshold value thM0. In step S53, if the average toggle rate (0, M) of the M-th bit is higher than the predetermined threshold value thM0 and normal images are being supplied, the processing proceeds to step S54.

In step S54, the determination unit 53 sets a threshold value thM1 for detecting an error in a difference between average toggle rates of the M-th bit of a preceding and a subsequent stages of each of the subsequent signal processing units 52 to a normal threshold value.

On the other hand, in step S53, if the average toggle rate (0, M) of the M-th bit is smaller than the predetermined threshold value thM0 and it is assumed that error images are input, the processing proceeds to step S55.

In step S55, the determination unit 53 sets the threshold value thM1 for detecting an error in a difference between average toggle rates of the M—the bit of a preceding and a subsequent stages of each of the subsequent signal processing units 52 to a sufficiently low value. In other words, there is a high possibility that the input image is an error image, thus there is a possibility that similar images will be input thereafter, and even when there is no change in average toggle rates (N, M) of a preceding and a subsequent stages of each of the subsequent signal processing units 52-1 to 52-4, there is a possibility that no error has occurred in the signal processing units 52-1 to 52-4. Therefore, the threshold value thM1 is set to be sufficiently small such that it is assumed that no error has occurred even in a case where there is no change.

In step S56, the determination unit 53 determines whether the counter M for distinguishing the bit position is set to 15. That is, it is determined whether the threshold value thM1 is set for each of all bits. If the threshold value thM1 is not set for each of all the bits, the processing proceeds to step S57.

In step S57, the determination unit 53 increments the counter M for distinguishing the bit position by one, and the processing returns to step S52.

That is, the processing of steps S52 to S56 is repeated until the threshold value thM1 is set for each bit. Then, in step S56, if the threshold value thM1 is set for all the bits, the processing proceeds to step S58.

Note that, as for the threshold value thM1 set to each bit, it is desirable that an appropriate value is set depending on a characteristic of the current pixel signals subjected to signal processing. Furthermore, it is desirable that an appropriate threshold value is set for each bit. That is, in a pixel signal, the higher a bit is, the lower an average toggle rate is, and the lower a bit is, the higher a toggle rate is. That is, higher bits do not change unless there is a large variation, but lower bits are susceptible to small variations. Therefore, it is desirable that the threshold value thM1 set for each bit is set to an appropriate value depending on the bit position. For example, it is desirable that an appropriate value is set on the basis of statistical processing or the like.

In step S58, the determination unit 53 initializes the counter M for distinguishing the bit position to 0.

In step S59, the determination unit 53 increments, by one, the counter N for distinguishing a stage number of the toggle rate calculating unit 51-N and the signal processing unit 52-N.

In step S60, the signal processing unit 52-N in the Nth stage executes signal processing of the Nth stage and outputs the result to the toggle rate calculating unit 51-N in the subsequent stage.

In step S61, the toggle rate calculating unit 51-N calculates the average toggle rate (N, M) of the M-th bit for one frame in the signal processing result of the signal processing unit 52-N of the Nth stage and outputs the calculation result to the determination unit 53.

In step S62, the determination unit 53 determines whether an absolute value of a difference between the average toggle rate (N, M) in a subsequent stage of the signal processing unit 52-N of the M-th bit of the Nth stage and an average toggle rate (N−1, M) of a preceding stage is larger than the predetermined threshold value thM1.

In step S62, for example, if the absolute value of the difference between the average toggle rate (N−1, M) and the average toggle rate (N, M) is larger than the predetermined threshold value thM1, there is a large change in the average toggle rate, and it is assumed that there is an error in the M-th bit in the signal processing unit 52-N of the Nth stage, the processing proceeds to step S63.

In step S63, the determination unit 53 stores that an error is occurring in the M-th bit of the signal processing unit 52-N of the N-th stage.

On the other hand, in step S62 for example if the absolute value of the difference between the average toggle rate (N−1) and the average toggle rate (N) is smaller than the predetermined threshold value thM1, there is no large change in the average toggle rate, and it is assumed that there is no error in the M-th bit of the signal processing unit 52-N of the Nth stage, the processing of step S63 is skipped.

In step S64, the determination unit 53 determines whether the counter M for distinguishing the bit positions is set to 15, that is, whether there has been an error has been determined for all the bits. If whether there is an error has not been determined for all the bits, the processing proceeds to step S65.

In step S65, the determination unit 53 increments the counter M by one, and the processing returns to step S61.

That is, the processing of steps S60 to S65 is repeated until it is determined whether there is an error for all the bits of signal processing unit 52-N of the N-th stage. Then, in step S64, the determination unit 53 determines whether there is an error for all the bits in the Nth stage, and then the processing proceeds to step S66.

In step S66, the determination unit 53 confirms whether the counter N for distinguishing the toggle rate calculating units 51-N and the signal processing units 52-N is 4, that is, whether it has been confirmed whether there is an error in the signal processing units 52 of all the four stages. In step S66, if the counter N is not 4, the processing returns to step S59, and the processing of steps S59 to S66 is repeated until the counter N reaches 4, that is, until whether an error is occurring is confirmed for all the bits of the signal processing units 52-1 to 52-4.

Then, in step S66 if whether an error is occurring is confirmed for all the bits of all the signal processing units 52-1 to 52-4 and it is assumed that the counter N has reached 4, the processing proceeds to step S67.

In step S67, the determination unit 53 determines whether an error is occurring for each bit in the signal processing units 52-1 to 52-4. If an error is occurring, the processing proceeds to step S68.

In step S68, the determination unit 53 outputs information for specifying the bit position of a signal processing unit 52 in which the error is occurring to the subsequent stage LSI 33.

By this processing, the subsequent stage LSI 33 displays, on the display unit 12, the information specifying the signal processing unit 52 together with the information indicating that the error is occurring, and the processing proceeds to step S69.

In step S69, the subsequent stage LSI 33 stops the driving assist by controlling the operation of the steering wheel, the brake, lights, etc. of the vehicle not illustrated using the processing results of the signal processing units 52-1 to 52-4 and displays so on the display unit 12 such that the driver can recognize so, and the processing proceeds to step S70.

On the other hand, if it is assumed in step S67 that no error is occurring, the processing proceeds to step S71.

In step S71, the determination unit 53 determines whether the threshold value thM1 is set to be smaller than usual, that is, whether an error of the input image has occurred. In step S71, if the threshold value thM1 is set to be smaller than usual, and the input image is for example a black image or the like, and thus appropriate image processing is difficult, the processing proceeds to step S69.

That is, in this case, since the input image is a black image or the like, it cannot be determined whether an error or the like is occurring in the signal processing units 52-1 to 52-4. However, as for driving assist using signal processing results of the signal processing units 52-1 to 52-4, this may not be executed properly, and thus only the driving assist is stopped, and only that fact is displayed on the display unit 12.

On the other hand, if in step S71 the threshold value thM1 is not set to be smaller than usual with a normal state in which processing can be appropriately performed, the processing proceeds to step S70.

In other words, in this case, since the input image is not a black image or the like, and it can be assumed that there is no error, the subsequent stage LSI 33 continues to assist driving of the driver by controlling the operation of the steering wheel, the brake, lights, etc. of the vehicle not illustrated on the basis of respective signal processing results of each bit of the signal processing units 52-1 to 52-4.

In step S70, the determination unit 53 determines whether a next image, that is, a next frame is input. If the next frame is input, the processing returns to step S51, and the subsequent processing is repeated. Then, if no next frame is input in step S70, the processing is terminated.

Figure 6:
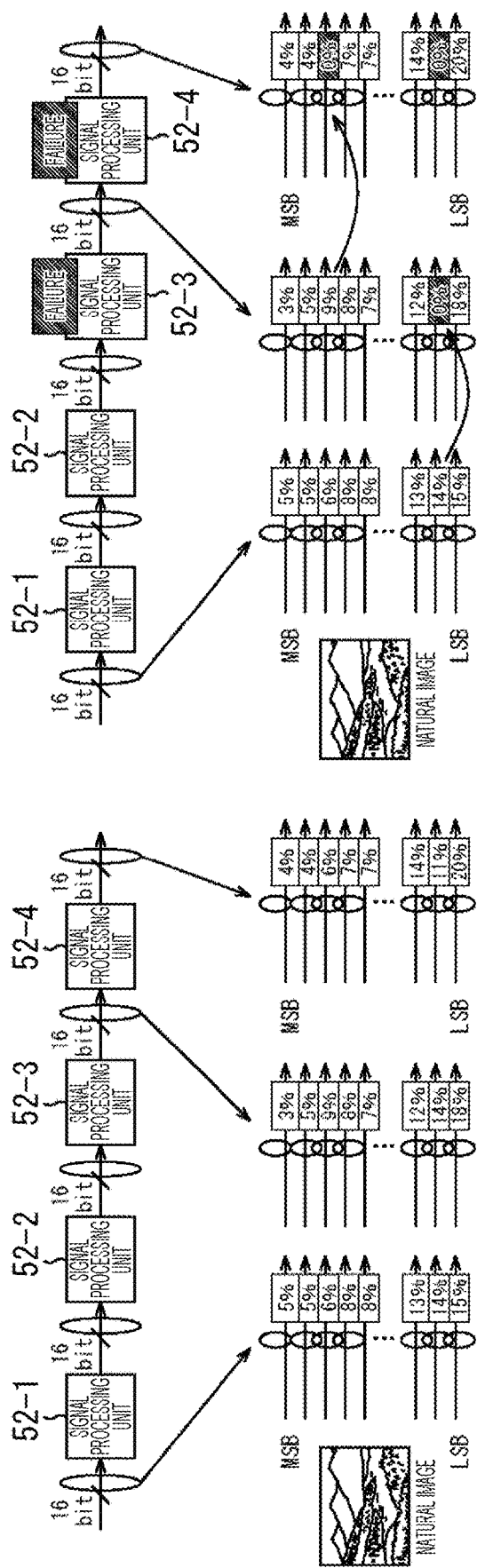
FIG. 6 is a diagram for explaining the error determination processing according to the flowchart of FIG. 5.

By the above processing, for example in a case where a natural image is input as illustrated in the left part of FIG. 6, for each bit of the upper three bits (three bis from MSB) and the lower five bits (five bits from LSB) calculated by the toggle rate calculating unit 51-0 in the preceding stage of the signal processing unit 52-1, the average toggle rate (0, M) changes from 5% to 5%, 6%, 8%, 8%, 13%, 14%, and 15% from the top in the figure. In such a case, it is assumed that a normal image has been input, and the threshold value thM1 is set to a normal threshold value.

Here, the threshold value thM1 at a bit position close to the MSB has a smaller average toggle rate, and thus the threshold value thM1 is set to be smaller. On the other hand, the threshold value thM1 at a bit position close to the LSB has a higher average toggle rate, and thus the threshold value thM1 is set to be higher.

Meanwhile, the average toggle rate (3, M) of each bit in the subsequent stage of the signal processing unit 52-3 in the third stage in the case of the left part of FIG. 6 changes from 3% to 5%, 9%, 8%, 7%, 12%, 14%, and 18% from the top in the figure. Furthermore, the average toggle rate (4, M) of each bit in the subsequent stage of the signal processing unit 52-4 in the fourth stage in the case of the upper left part of FIG. 6 changes from 4% to 4%, 6%, 7%, 7%, 14%, 11%, and 20% from the top in the figure.

That is, in the case as illustrated in the left part of FIG. 6, since the difference in the average toggle rates for each bit is larger than the predetermined threshold value thM1, it is assumed that no error is occurring.

On the other hand, for example in the case as illustrated in the right part of FIG. 6, the average toggle rate (3, 1) is 0% in the second lowest bit position (M=1) in the subsequent stage of the signal processing unit 52-3 of the third stage, and thereafter, the average toggle rate (4, 1) is 0% in the second lowest bit position of the signal processing unit 52-4 of the fourth stage.

Similarly, as illustrated in the right part of FIG. 6, the average toggle rate (4, 13) is 0% in the upper 13th bit in the subsequent stage of the signal processing unit 52-4 of the fourth stage.

As a result, in the case as illustrated in the right part of FIG. 6, it can be assumed that an error is occurring in the first bit in the signal processing unit 52-3 and the 13th bit in the signal processing unit 52-4.

In this manner, it is possible to accurately detect at which bit position in the signal processing unit 52 of which stage an error is occurring.

Figure 7:
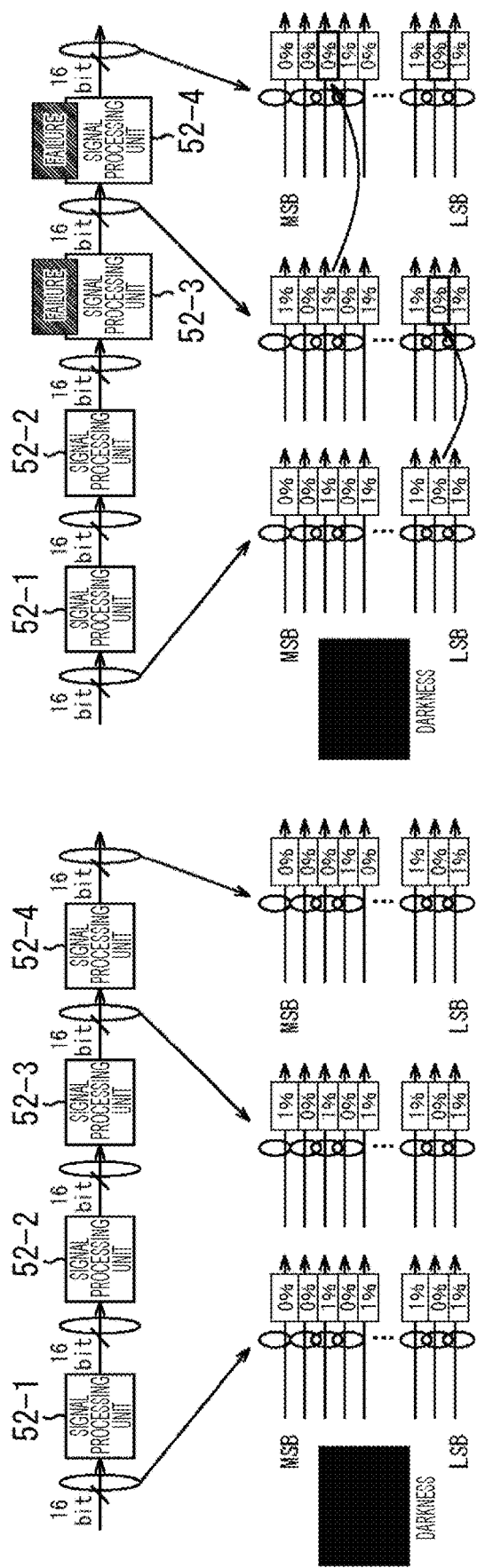
FIG. 7 is a diagram for explaining the error determination processing according to the flowchart of FIG. 5.

Furthermore, in the case where a black image such as darkness is the input image, for example as illustrated in the left part of FIG. 7, for each bit of the upper three bits (three bis from MSB) and the lower five bits (five bits from LSB) calculated by the toggle rate calculating unit 51-0 in the preceding stage of the signal processing unit 52-1, the average toggle rate (0, M) changes from 0% to 0%, 1%, 0%, 1%, 1%, 0%, and 1% from the top in the figure. In such a case, it is not assumed that a normal image has been input, and thus the threshold value thM1 is set to a value sufficiently lower than a normal threshold value.

As a result, the average toggle rate (3, M) of each bit in the subsequent stage of the signal processing unit 52-3 in the third stage in the case of the left part of FIG. 7 changes from 1% to 0%, 1%, 0%, 1%, 1%, 0%, and 1% from the top in the figure. Furthermore, the average toggle rate (4, M) of each bit in the subsequent stage of the signal processing unit 52-4 in the fourth stage in the case of the left part of FIG. 7 changes from 0% to 0%, 0%, 1%, 0%, 1%, 0%, and 1% from the top in the figure.

In the case as illustrated in the left part of FIG. 7, the predetermined threshold value thM1 having a sufficiently small difference in the average toggle rates is set for each bit, and it is assumed that no error is occurring.

On the other hand, for example in the case as illustrated in the right part of FIG. 7, the average toggle rate (3, 1) is 0% in the second lowest bit position (M=1) in the subsequent stage of the signal processing unit 52-3 of the third stage, and thereafter, the average toggle rate (4, 1) is 0% in the second lowest bit position of the signal processing unit 52-4 of the fourth stage.

Similarly, as illustrated in the right part of FIG. 7, the average toggle rate (4, 13) is 0% in the upper 13th bit in the subsequent stage of the signal processing unit 52-4 of the fourth stage.

Note that in the case as illustrated in the right part of FIG. 7, the predetermined threshold value thM1 having a sufficiently small difference in the average toggle rates is set, and it is assumed that no error is occurring.

As a result, since it cannot be determined in this case whether an error or the like is occurring in which one of the signal processing units 52-1 to 52-4, notification of an error is not performed.

In this case, however, from the viewpoint of safety, it is desirable to stop the driving assist based on images which cannot be judged appropriately and to notify the driver that the driving assist has been stopped.

Note that, as described with reference to the flowchart of FIG. 3, also in this example it is possible to set the block-specific coefficient kN for each of the signal processing units 52-N and multiply threshold value thM1 by the block-specific coefficient kN. By using the block-specific coefficient kN, it is possible to detect whether there is a failure in the signal processing unit 52-N for each bit with a higher accuracy by setting, for each bit, the threshold value thM11, which is the threshold value thM1 corrected depending on a separate characteristic of a signal processing unit 52-N.

With the above processing, it is possible to implement detection of a failure in an image processing device for each bit in real time and without using specific current data (dependent on a test image) or an arithmetic operation parameter that is uniquely set.

In addition, in implementing the function of implementing driving assist using images, it is possible to detect occurrence of an error in real time, to suppress occurrence of malfunction in driving assist, and to present to the driver that driving assist has been stopped.

3. Second Embodiment

In the above, an example of the in-vehicle camera system using one image sensor which is a so-called monocular image has been described; however for example, a stereo image may be captured using two in-vehicle camera systems, and driving assist using the stereo image may be performed. In this case, if it is assumed that an error is occurring in one of the images, a stereo image cannot be acquired, and thus the driving assist may be stopped, and the occurrence of the error (abnormality) may be notified to the driver.

Figure 8:
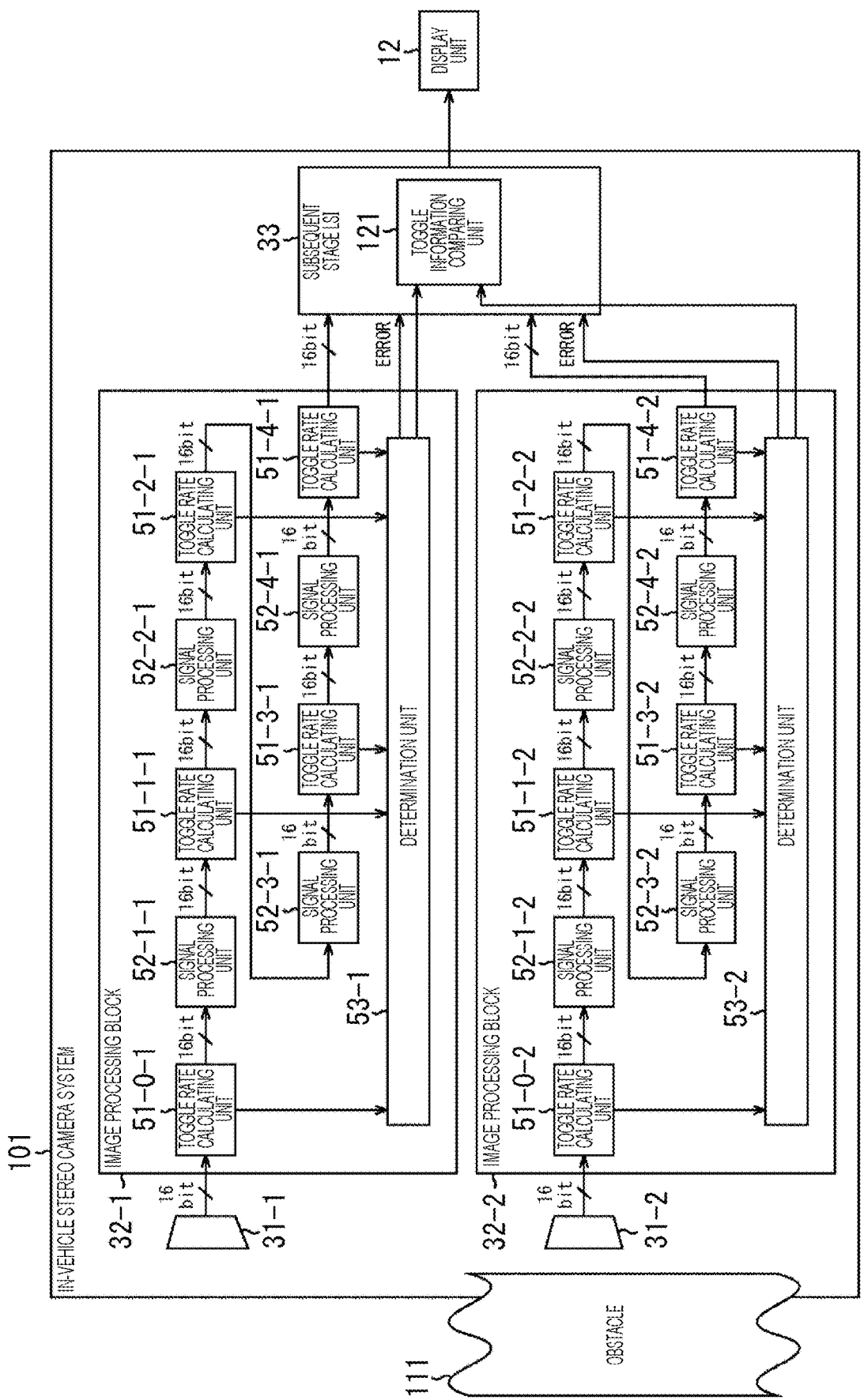
FIG. 8 is a diagram illustrating a configuration example of an in-vehicle stereo camera system to which the present disclosure is applied.

FIG. 8 illustrates a configuration example of an in-vehicle stereo camera system 101 using the image sensor 31 and the image processing block 32 of the in-vehicle camera system 11 of FIG. 1 for a right eye image and a left eye image.

Note that in the in-vehicle stereo camera system 101 of FIG. 8, basically, "-1" is attached to each configuration corresponding to the image sensor 31 and the image processing block 32 of the in-vehicle camera system 11 of FIG. 1 for the right eye while "-2" is attached to each configuration corresponding to the in-vehicle camera system 11 of FIG. 1 for the left eye. For this reason, explanations on them will be omitted as appropriate.

That is, in the in-vehicle stereo camera system 101 in FIG. 8 points different from the in-vehicle camera system 11 of FIG. 1 is that one subsequent stage LSI 33 is provided to image sensors 31-1 and 31-2 and image processing blocks 32-1 and 32-2 and that the image processing blocks 32-1 and 32-2 both supply an average toggle rate of the fourth stage, which is the last stage, to the subsequent stage LSI 33, and furthermore a toggle information comparing unit 121 is provided.

The toggle information comparing unit 121 compares error determination processing results and toggle rates from the right and the left image processing blocks 32-1 and 32-2. If there is an error in at least one of the above or there is a difference greater than or equal to a predetermined value in the average toggle rates of the above, it is assumed that one or both of a left and a right images cannot be used, and driving assist by controlling the operation of a steering wheel, a brake, lights, etc. of a vehicle (not illustrated) is stopped while an error location in the in-vehicle camera systems 11-1 and 11-2 or that there is a difference in the average toggle rates of the right and the left images and that some type of error is occurring is output and displayed on the display unit 12.

<Error Determination Processing by in-Vehicle Stereo Camera System of FIG. 8>

Figure 9:
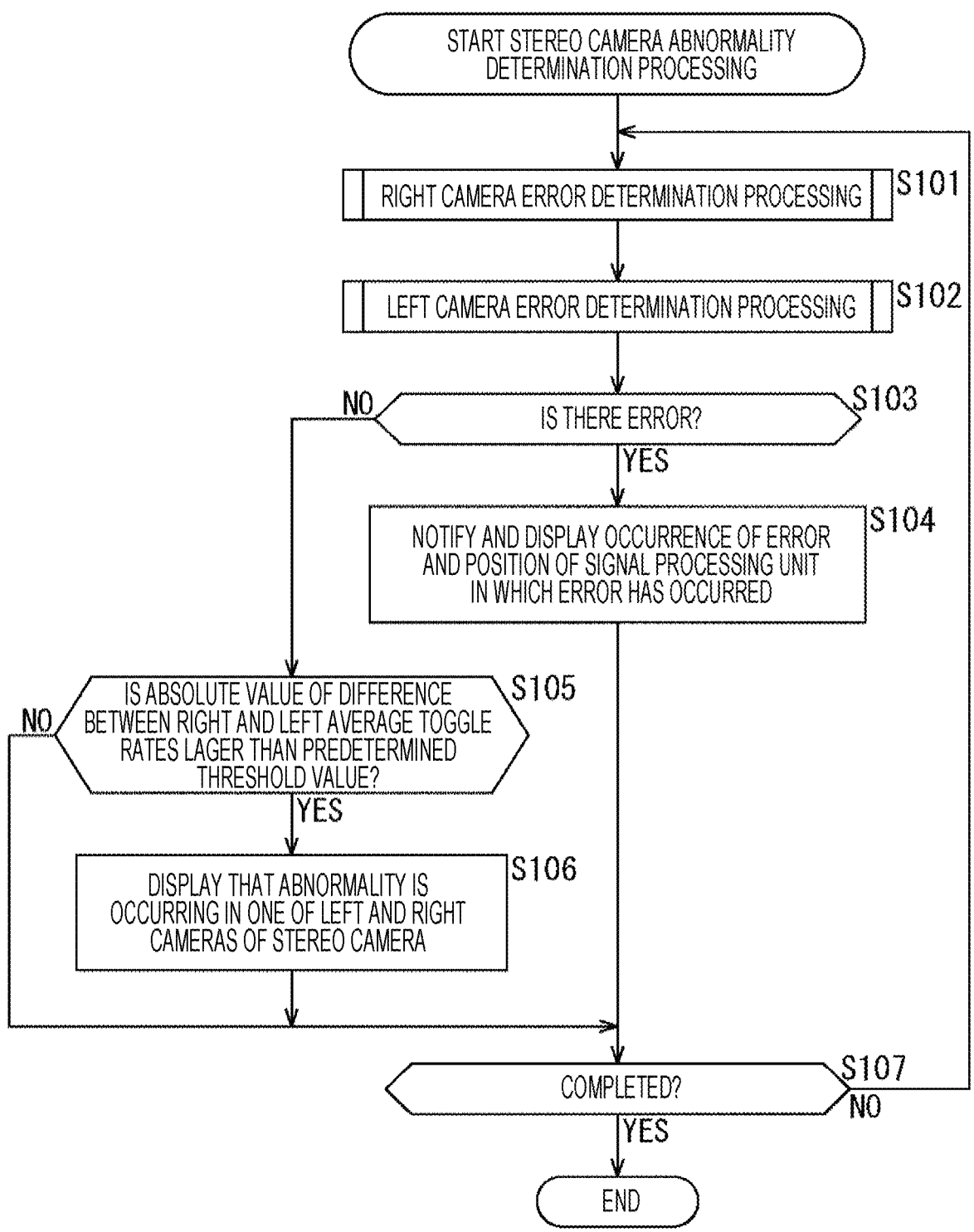
FIG. 9 is a flowchart for explaining error determination processing in the in-vehicle stereo camera system of FIG. 8.

Next, with reference to a flowchart of FIG. 9, error determination processing by the in-vehicle stereo camera system of FIG. 8 will be described.

In step S101, the image sensor 31-1 and the image processing block 32-1 corresponding to the in-vehicle camera system for the right eye execute right camera error determination processing and outputs the determination result and information of respective average toggle rates to the subsequent stage LSI 33. Note that the right camera error determination processing is for executing the error determination processing described with reference to the flowchart of FIG. 3 or FIG. 5 on an image for the right eye, descriptions thereof will be omitted. In addition, at this time, the determination unit 53-1 of the image processing block 32-1 outputs an average toggle rate of all bits or average toggle rates of each bit as the average toggle rate of the fourth stage.

In step S102, the image sensor 31-2 and the image processing block 32-2 corresponding to the in-vehicle camera system for the left eye execute left camera error determination processing and outputs the determination result and information of respective average toggle rates to the subsequent stage LSI 33. Note that the left camera error determination processing is for executing the error determination processing described with reference to the flowchart of FIG. 3 or FIG. 5 on an image for the left eye, descriptions thereof will be omitted. In addition, at this time, the determination unit 53-2 of the image processing block 32-2 outputs an average toggle rate of all bits or average toggle rates of each bit as the average toggle rate of the fourth stage.

In step S103, on the basis of the right and the left camera error determination processing, the subsequent stage LSI 33 determines whether an error is detected in at least one of the above.

Figure 5:
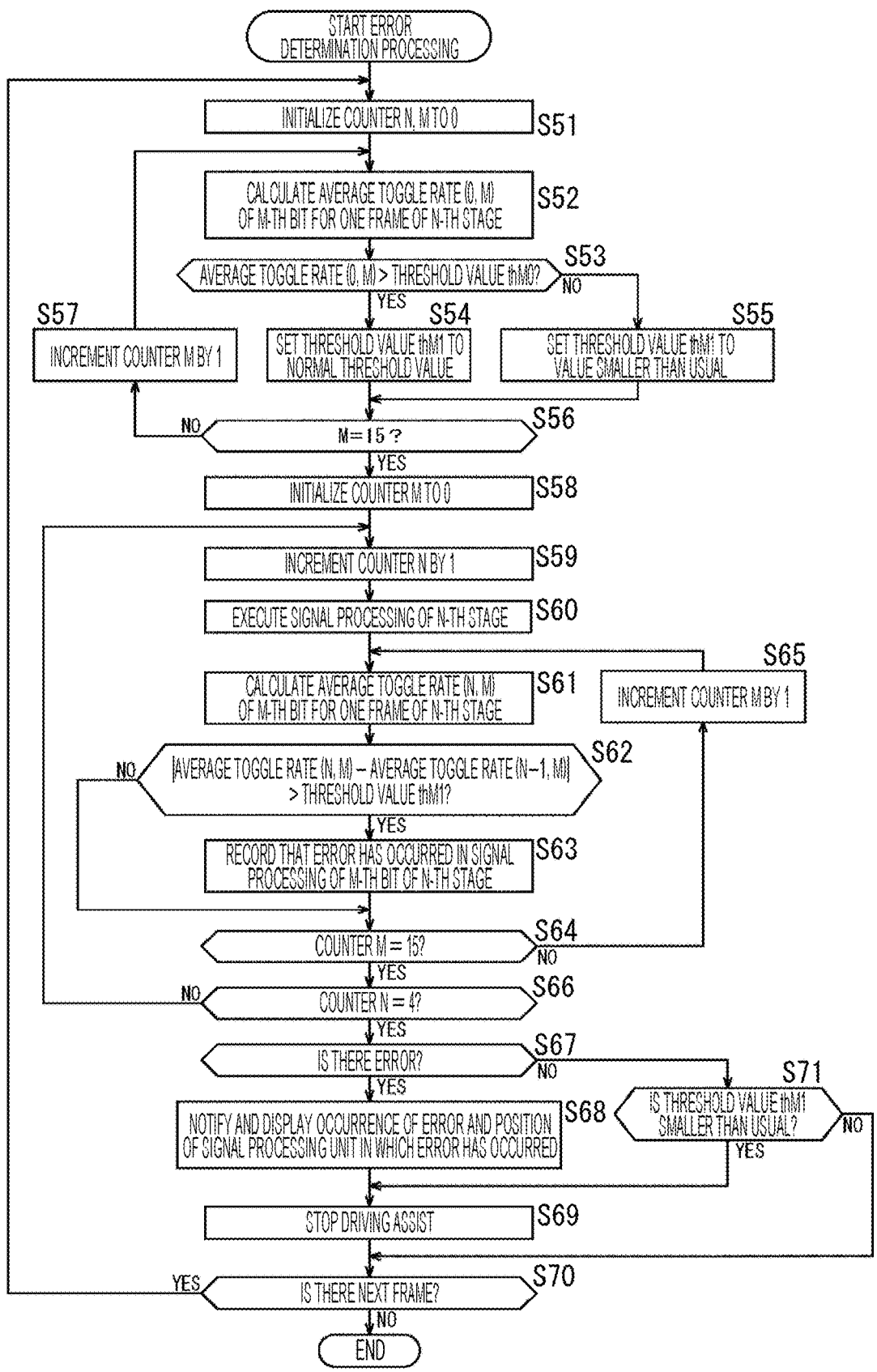
FIG. 5 is a flowchart for explaining other error determination processing in the in-vehicle camera system of FIG. 1.

In step S104, the subsequent stage LSI 33 stops the driving assist based on camera images, and at the same time displays information of the position of the signal processing unit 52 (and the bit position: in a case where the error determination processing of the flowchart of FIG. 5 is executed) in which an error is occurring on a display unit 12 and that the driving assist has been terminated.

In step S103, alternatively if no error is detected from any of the right and the left images, the processing proceeds to step S105.

In step S105, the subsequent stage LSI 33 controls the toggle information comparing unit 121 and determines whether an absolute value of a difference between the right and the left average toggle rates is larger than a predetermined threshold value and a difference is occurring between the right and the left. If it is assumed in step S105 that the absolute value of the difference between the right and the left average toggle rates is larger than the predetermined threshold value and that a difference is generated between the right and the left, the processing proceeds to step S106.

In step S106, the subsequent stage LSI 33 stops the driving assist based on camera images and at the same time displays, on the display unit 12, that there is a difference between the right and the left images and thus driving cannot be appropriately assisted and that the driving assist has been terminated. Note that here, in the case of the processing of the flowchart of FIG. 3, information indicating in which one of the signal processing units 52 of the first stage to the fourth stage there is a difference in the right and the left is displayed. Alternatively, in the case of the processing of the flowchart of FIG. 5, information indicating in which bit of which one of the signal processing units 52 of the first stage to the fourth stage there is a difference in the right and the left is displayed.

For example as illustrated in FIG. 8, in a case where an obstacle 111 that hinders capturing of an image is attached to the front surface of the image sensor 31-2, for example on a front window or the like, there are cases where a black image is captured.

In such a case, no error is detected in the processing described above. However, when a significant difference is occurring between left and right images, an appropriate stereo image required for driving assist cannot be acquired, and it is necessary to assume a state in which an error is substantially occurring.

Therefore, in this case, there is a significant difference between the right and the left images, the processing for controlling the driving assist is stopped, and this fact is displayed on the display unit 12.

By stopping the driving assist and informing the driver of the fact only in a case where an image that is substantially improper for use has been captured in this manner, it is possible to implement appropriate driving assist while an unnecessary notification of an error is suppressed such as occurrence of a failure even though there is a possibility of not being attributable to a failure.

Note that in step S105, if the absolute value of the difference between the right and the left average toggle rates is lower than the predetermined threshold value, it is assumed that normal processing is implemented, and the processing of steps S104 and S106 is skipped.

With the above processing, it is possible to appropriately implement error determination while issuance of an unnecessary error notification is suppressed.

Moreover, it is possible to implement failure detection of the image processing device without using specific current data (dependent on a test image) or an arithmetic operation parameter that is uniquely set.

Furthermore, the example in which the signal processing is performed on an image signal has been described in the above description; however, other signals may be used as long as signal processing can be performed, and a signal on which signal processing can be performed such as an audio signal and an optical signal can be used.

In addition, in the above description, the example in which an image signal subjected to signal processing is binary data and an error in a signal processing unit is detected using an average toggle rate of each bit or all bits has been described; however, data other than binary data may be used. For example digital data of each digit expressed in hexadecimal notation may be used. That is, in the above example, in a case where there is a change in the value of each digit of binary numbers of binary data, that is, in a case where there is a change in a value of each bit, a ratio of the number of times of change in each digit within time defined by a predetermined number of clocks is a toggle rate. Therefore, for example even with hexadecimal numbers other than binary numbers, whether a signal processing unit is normally operating may be determined by calculating a toggle rate as a ratio of the number of times of changes in each digit within the time defined by the predetermined number of clocks.

Furthermore, in the above description, the example in which the signal processing units 52 are arranged in four stages in series has been described; however, more stages or less stages may be used.

Furthermore in the above description, a plurality of stages of the signal processing units 52 may be configured in parallel, or a processing result of one signal processing unit 52 may be processed by a plurality of signal processing units 52. In either manner, whether an error is occurring in each of the signal processing units 52 may be determined depending on whether there is a large change, which is obtained by calculating toggle rates of a preceding stage and a subsequent stage of a signal processing unit 52 and comparing the two.

4. First Application Example

<Example of Execution by Software>

Meanwhile, the series of processing described above may be executed by hardware or software. In the case of executing the series of processing by software, a program implementing the software is installed, from a recording medium, in a computer incorporated in dedicated hardware, a general-purpose personal computer capable of executing various functions by installing various programs, or the like, for example.

Figure 10:
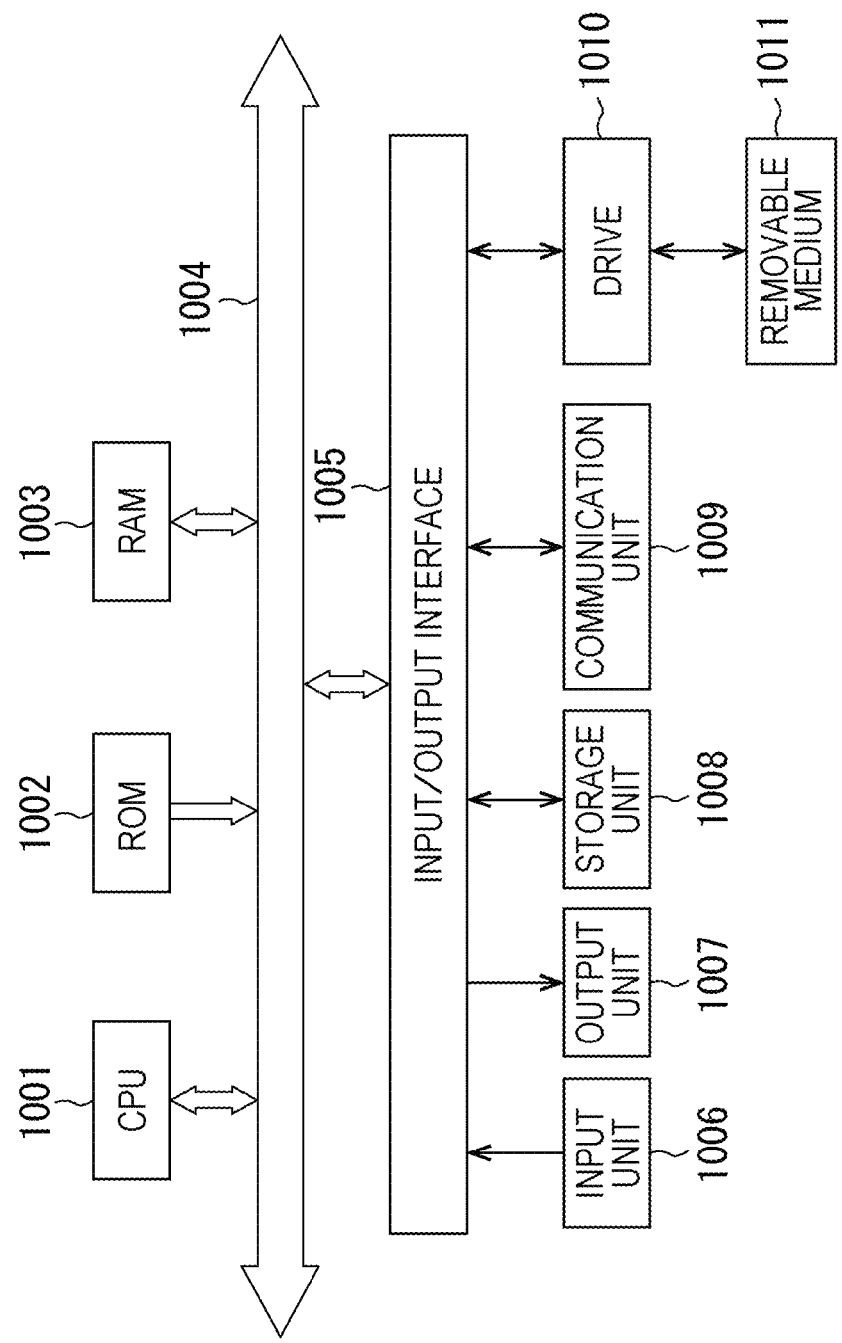
FIG. 10 is a diagram for explaining a configuration example of a general-purpose personal computer.

FIG. 10 illustrates a configuration example of a general-purpose personal computer. This personal computer has a built-in central processing unit (CPU) 1001. The CPU 1001 is connected with an input/output interface 1005 via bus 1004. The bus 1004 is connected with a read only memory (ROM) 1002 and a random access memory (RAM) 1003.

The input/output interface 1005 is connected with an input unit 1006 including an input device such as a keyboard and a mouse with which a user inputs an operation command, an output unit 1007 for outputting a processing operation screen or an image of a processing result to a display device, a storage unit 1008 including a hard disk drive or the like for storing a program or various data, and a communication unit 1009 for executing communication processing via a network represented by the Internet, the communication unit 1009 including a local area network (LAN) adaptor or the like. Further connected is a drive 1010 for reading and writing data from and to a removable medium 1011 such as a magnetic disk (including a flexible disk), an optical disk (including a compact disc-read only memory (CD-ROM) and a digital versatile disc (DVD)), a magneto-optical disk (including an mini disc (MD)), or a semiconductor memory.

The CPU 1001 executes various processing according to a program stored in the ROM 1002 or a program read out from the removable medium 1011 such as a magnetic disk, an optical disk, a magneto-optical disk, or a semiconductor memory, installed in the storage unit 1008, and loaded into the RAM 1003 from the storage unit 1008. Also, the RAM 1003 also stores, as appropriate, data and other information necessary for the CPU 1001 to execute various processing.

In the computer configured in the above manner, the series of processing described above is performed by the CPU 1001, for example, by loading a program stored in the storage unit 1008 to the RAM 1003 via the input/output interface 1005 and the bus 1004 and executing the program.

The program executed by the computer (CPU 1001) can be provided while recorded in the removable medium 1011 as a package medium or the like, for example. Alternatively, the program may be provided via a wired or wireless transmission medium such as a local area network, the Internet, and digital satellite broadcasting.

In the computer, a program can be installed in the storage unit 1008 via the input/output interface 1005 by mounting the removable medium 1011 to the drive 1010. Moreover, the program can be received by the communication unit 1009 via a wired or wireless transmission medium and be installed in the storage unit 1008. Alternatively, the program may be installed in advance in the ROM 1002 or the storage unit 1008.

Note that the program executed by the computer may perform processing in time series along the order described herein or may perform processing in parallel or at a necessary timing such as upon a call.

Note that, in the present description, a system means a collection of a plurality of components (devices, modules (parts), or the like) regardless of whether all the components are in the same housing. Therefore, either one of a plurality of devices accommodated in separate housings and connected via a network or a device in which a plurality of modules is accommodated in one housing is a system.

Note that embodiments of the present disclosure are not limited to the aforementioned embodiments and may include various modifications within a scope not departing from the principles of the present disclosure.

For example, the present disclosure may employ cloud computing in which one function is processed by a plurality of devices in a shared and collaborative manner via a network.

Moreover, each of the steps described in the above flowchart may be executed by one device or by a plurality of devices in a shared manner.

Furthermore, in a case where a plurality of types processing is included in one step, the plurality of types of processing included in that one step may be executed by one device or by a plurality of devices in a shared manner.

5. Second Application Example

The technology according to the present disclosure can be applied to various products. For example, the technology according to the present disclosure may be implemented as a device mounted on a moving body of one of types such as automobiles, electric vehicles, hybrid electric vehicles, motorcycles, bicycles, personal mobility, airplanes, drones, ships, robots, construction machines, agricultural machines (tractors).

Figure 11:
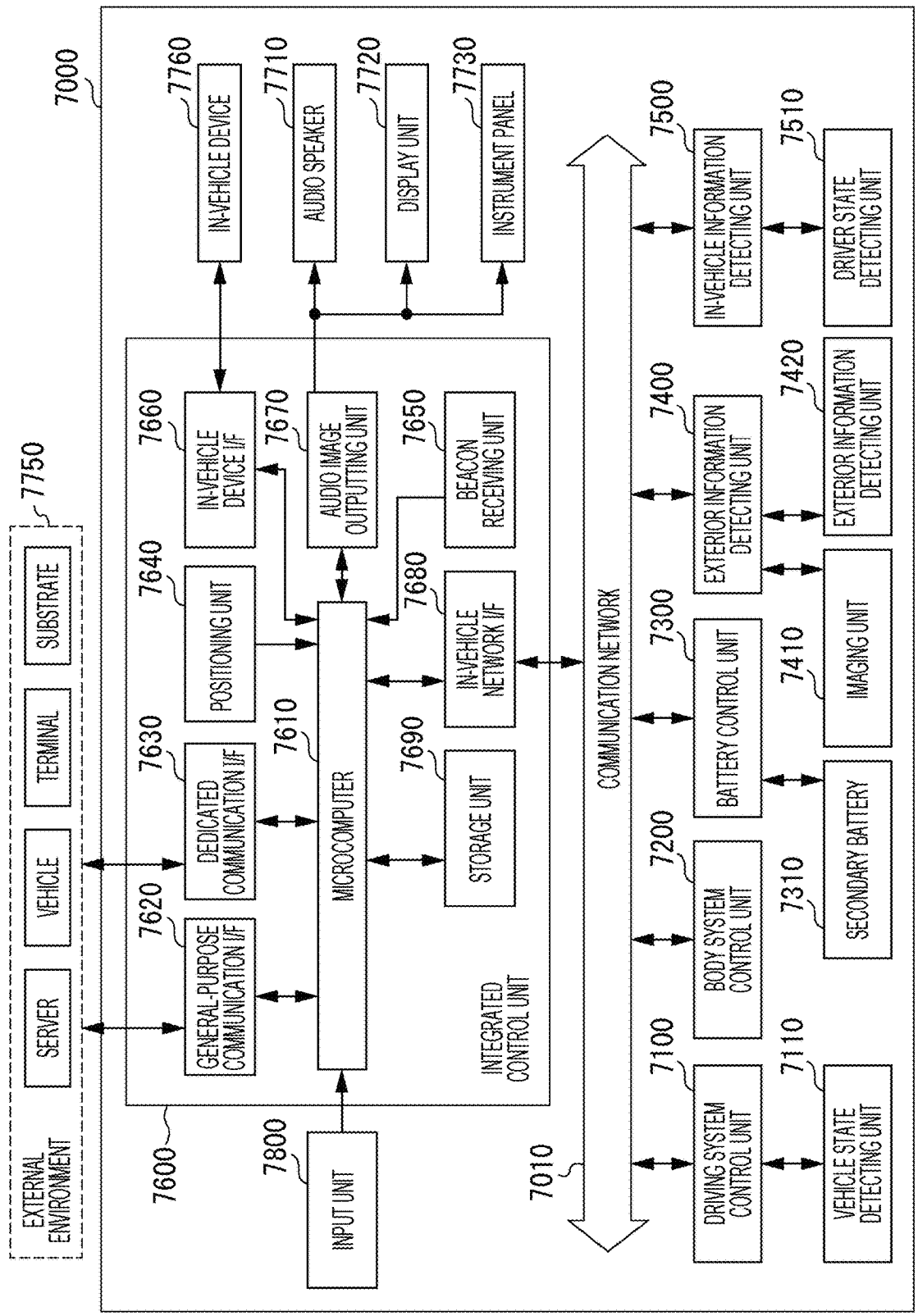
FIG. 11 is a block diagram illustrating an example of a schematic configuration of a vehicle control system.

FIG. 11 is a block diagram illustrating a schematic configuration example of a vehicle control system 7000 which is an example of a moving body controlling system to which the technology according to the present disclosure can be applied. The vehicle control system 7000 includes a plurality of electronic control units connected via a communication network 7010. In the example illustrated in FIG. 11, the vehicle control system 7000 includes a driving system control unit 7100, a body system control unit 7200, a battery control unit 7300, an exterior information detecting unit 7400, an in-vehicle information detecting unit 7500, and an integrated control unit 7600. The communication network 7010 connecting the plurality of control units may be, for example, an in-vehicle communication network compliant with a desired standard such as a controller area network (CAN), a local interconnect network (LIN), a local area network (LAN), or FlexRay (registered trademark).

Each of the control units includes a microcomputer which performs arithmetic processing in accordance with various programs, a storage unit which stores a program executed by the microcomputer, parameters used for various arithmetic operations, or the like, and a driving circuit which drives a device of various types to be controlled. Each of the control units includes a network I/F for communicating with another control unit via the communication network 7010 and also includes a communication I/F for performing communication by wired communication or wireless communication with a device, a sensor, or the like inside or outside a vehicle. In FIG. 11, as a functional configuration of the integrated control unit 7600, a microcomputer 7610, a general-purpose communication I/F 7620, a dedicated communication I/F 7630, a positioning unit 7640, a beacon reception unit 7650, an in-vehicle device I/F 7660, an audio image outputting unit 7670, an in-vehicle network I/F 7680, and a storage unit 7690 are illustrated. Similarly, the other control units also include a microcomputer, a communication I/F, a storage unit, and other components.

The driving system control unit 7100 controls the operation of devices related to the driving system of the vehicle in accordance with various programs. For example, the driving system control unit 7100 functions as control device such as a driving force generating device for generating driving force of the vehicle such as an internal combustion engine or a driving motor, a driving force transmission mechanism for transmitting driving force to wheels, a steering mechanism for adjusting a steering angle of the vehicle, and a braking device for generating braking force of the vehicle. The driving system control unit 7100 may have a function as a control device such as an antilock brake system (ABS) or an electronic stability control (ESC).

The driving system control unit 7100 is connected with a vehicle state detecting unit 7110. The vehicle state detecting unit 7110 includes at least one of a gyrosensor for detecting an angular velocity of axial rotation motion of a vehicle body, an acceleration sensor for detecting acceleration of a vehicle, and a sensor for detecting an operation amount of an acceleration pedal, an operation amount of a brake pedal, a steering angle of a steering wheel, an engine speed, a turning speed of wheels, or the like, for example. The driving system control unit 7100 performs arithmetic processing using a signal input from the vehicle state detecting unit 7110 and controls an internal combustion engine, a driving motor, an electric power steering device, a braking device, or the like.

The body system control unit 7200 controls the operation of various devices mounted to the vehicle body in accordance with various programs. For example, the body system control unit 7200 functions as a control device of a keyless entry system, a smart key system, an automatic window device, or various types of lamps such as a head lamp, a back lamp, a brake lamp, an indicator lamp, or a fog lamp. In this case, the body system control unit 7200 may be input with a radio wave transmitted from a portable device that substitute a key or signals of various switches. The body system control unit 7200 receives input of such a radio wave or a signal and controls a door lock device, an automatic window device, a lamp device, or other devices of the vehicle.

The battery control unit 7300 controls a secondary battery 7310, which is a power supply source of the driving motor, in accordance with various programs. For example, the battery control unit 7300 is input with information such as a battery temperature, a battery output voltage, or a remaining capacity of the battery from a battery device including the secondary battery 7310. The battery control unit 7300 performs arithmetic processing using these signals and performs temperature adjusting control of the secondary battery 7310 or control of a cooling device or other devices included in the battery device.

The exterior information detecting unit 7400 detects exterior information of the vehicle mounted with the vehicle control system 7000. For example, the exterior information detecting unit 7400 is connected with at least one of the imaging unit 7410 and the exterior information detecting unit 7420. The imaging unit 7410 includes at least one of a time of flight (ToF) camera, a stereo camera, a monocular camera, an infrared camera, and other cameras. The exterior information detecting unit 7420 includes at least one of, for example, an environmental sensor for detecting the current weather or meteorological phenomena and a surrounding information detecting sensor for detecting another vehicle, an obstacle, a pedestrian, or the like surrounding the vehicle mounted with the vehicle control system 7000.

The environmental sensor may be, for example, at least one of a raindrop sensor for detecting rainy weather, a fog sensor for detecting fog, a sunshine sensor for detecting the degree of sunshine, and a snow sensor for detecting snowfall. The ambient information detecting sensor may be at least one of an ultrasonic sensor, a radar device, and a light detection and ranging/laser imaging detection and ranging (LIDAR) device. The imaging unit 7410 and the exterior information detecting unit 7420 may separate sensors or devices or may be a device in which a plurality of sensors or devices are integrated.

Figure 12:
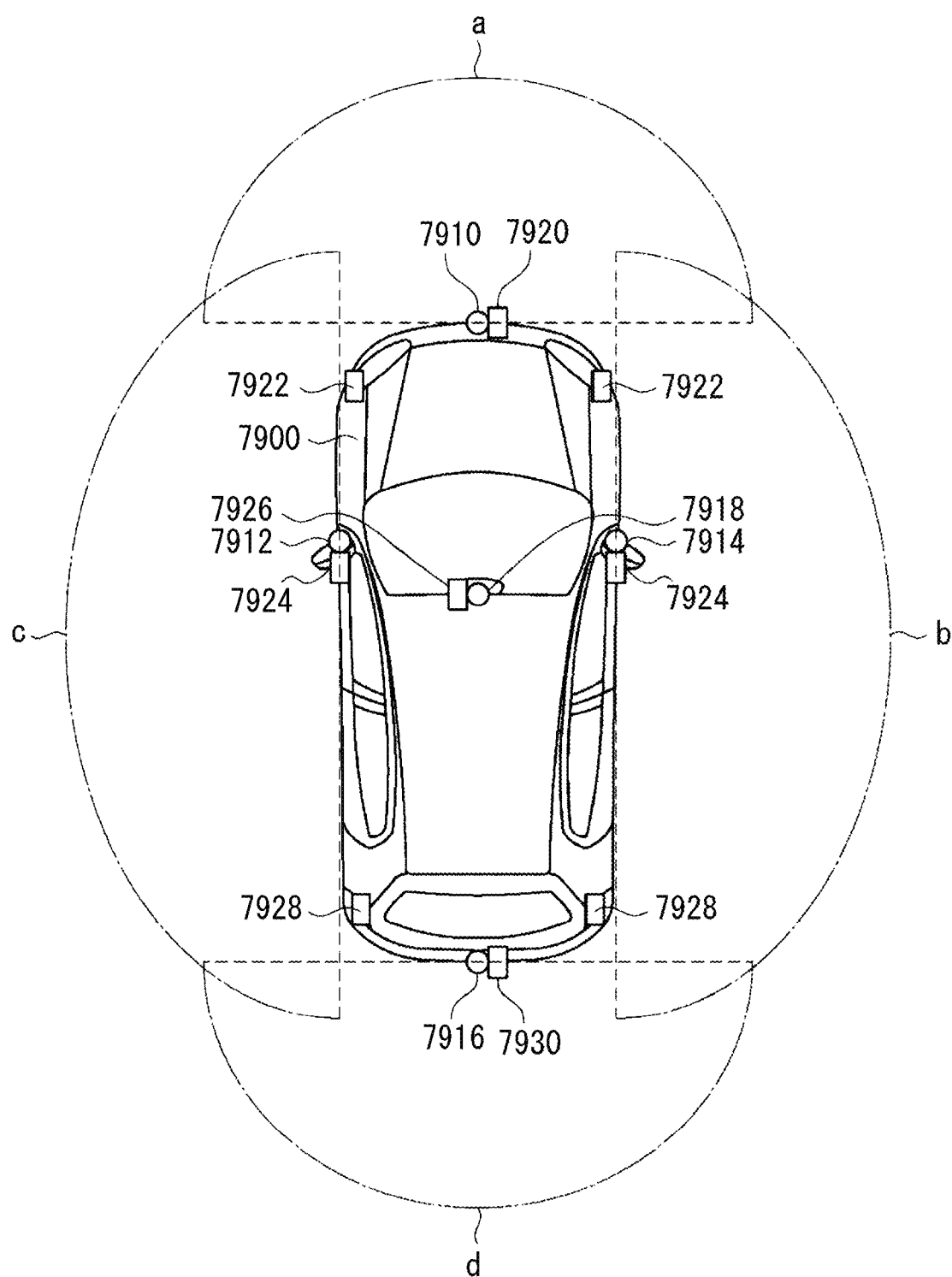
FIG. 12 is an explanatory diagram illustrating an example of installation positions of exterior information detecting units and imaging units.

Here, FIG. 12 illustrates an example of installation positions of the imaging unit 7410 and the exterior information detecting unit 7420. Imaging units 7910, 7912, 7914, 7916, and 7918 are installed at least one position out of a front nose, side mirrors, a rear bumper, a back door, and an upper part of a windshield in the interior of a vehicle 7900, for example. The imaging unit 7910 provided at the front nose and the imaging unit 7918 provided at the upper part of the windshield in the vehicle interior mainly acquire an image ahead of the vehicle 7900. The imaging units 7912 and 7914 provided at the side mirrors mainly acquire images on the sides of the vehicle 7900. The imaging unit 7916 provided at the rear bumper or the back door mainly acquires an images in the back of the vehicle 7900. An imaging unit 7918 provided at the upper part of the windshield in the vehicle interior is mainly used for detecting a preceding vehicle, a pedestrian, an obstacle, a traffic signal, a traffic sign, lanes, or the like.

Note that FIG. 12 illustrates an example of coverages of the respective imaging units 7910, 7912, 7914, and 7916. A coverage a represents a coverage of the imaging unit 7910 provided at the front nose, coverages b and c represent coverages of the imaging units 7912 and 7914 provided at the side mirrors, and a coverage d represents a coverage of the imaging unit 7916 provided at the rear bumper or the back door. For example, by overlapping image data captured by the imaging units 7910, 7912, 7914, and 7916, an overhead view image of the vehicle 7900 viewed from above can be obtained.

Exterior information detecting units 7920, 7922, 7924, 7926, 7928, and 7930 provided at the front, the rear, the sides, the corners, and the upper part of the windshield in the interior of the vehicle 7900 may be an ultrasonic sensor or a radar device, for example. The exterior information detecting units 7920, 7926, and 7930 provided at the front nose, the rear bumper, the back door, and the upper part of the windshield in the interior of the vehicle 7900 may be, for example, a LIDAR device. The exterior information detecting units 7920 to 7930 are mainly used for detecting a preceding vehicle, a pedestrian, an obstacle, or the like.

Returning to FIG. 11, descriptions will be continued. The exterior information detecting unit 7400 causes the imaging unit 7410 to capture an image outside the vehicle and receives the captured image data. The exterior information detecting unit 7400 further receives detection information from the exterior information detecting unit 7420 connected thereto. In a case where the exterior information detecting unit 7420 is an ultrasonic sensor, a radar device, or a LIDAR device, the exterior information detecting unit 7400 transmits ultrasonic waves, electromagnetic waves or the like and also receives information of received reflected waves. The exterior information detecting unit 7400 may perform object detection processing or distance detection processing of a person, a car, an obstacle, a sign, a character on a road surface, or the like on the basis of the received information. The exterior information detecting unit 7400 may perform environment recognition processing for recognizing rainfall, fog, road surface condition, etc. on the basis of the received information. The exterior information detecting unit 7400 may calculate a distance to an object outside the vehicle on the basis of the received information.

In addition, the exterior information detecting unit 7400 may perform image recognition processing or distance detection processing of a person, a car, an obstacle, a sign, a character on a road surface, or the like on the basis of the received image data. The exterior information detecting unit 7400 may perform processing such as distortion correction or alignment on the received image data and generate an overhead view image or a panorama image by combining image data captured by different imaging units 7410. The exterior information detecting unit 7400 may perform viewpoint converting processing using image data captured by different imaging units 7410.

The in-vehicle information detecting unit 7500 detects information inside the vehicle. The in-vehicle information detecting unit 7500 is connected with, for example, a driver state detecting unit 7510 that detects the state of a driver. The driver state detecting unit 7510 may include a camera for capturing the driver, a biosensor for detecting biological information of the driver, a microphone for collecting sounds in the vehicle interior, and the like. The biosensor is provided for example on a seating surface or a steering wheel or the like and detects biological information of an occupant sitting on the seat or a driver holding the steering wheel. The in-vehicle information detecting unit 7500 may calculate the degree of fatigue or the degree of concentration of the driver on the basis of detection information input from the driver state detecting unit 7510 or may determine whether the driver is drowsing. The in-vehicle information detecting unit 7500 may perform noise canceling processing or the like on collected audio signal.

The integrated control unit 7600 controls the overall operation in the vehicle control system 7000 in accordance with various programs. The integrated control unit 7600 is connected with an input unit 7800. The input unit 7800 is implemented by a device that can be operated for input by a passenger such as a touch panel, a button, a microphone, a switch, or a lever, for example. The integrated control unit 7600 may receive input of data obtained by voice recognition of voice input by a microphone. The input unit 7800 may be, for example, a remote control device that uses infrared rays or other radio waves or may be an externally connected device such as a mobile phone or a personal digital assistant (PDA) compatible with the operation of the vehicle control system 7000. The input unit 7800 may be for example a camera, and in this case a passenger can input information by gesture. Alternatively, data obtained by detecting the movement of a wearable device worn by a passenger may be input. Furthermore, the input unit 7800 may include, for example, an input control circuit or other circuits that generate an input signal on the basis of the information input by passengers or the like using the above input unit 7800 and output the input signal to the integrated control unit 7600, and the like. By operating the input unit 7800, passengers or the like input various data and instruct processing operations to the vehicle control system 7000.

The storage unit 7690 may include a read only memory (ROM) for storing various programs to be executed by the microcomputer and a random access memory (RAM) for storing various parameters, calculation results, sensor values, or the like. Moreover, the storage unit 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may implement a cellular communication protocol such as Global System of Mobile communications (GSM), WiMAX, Long Term Evolution (LTE) or LTE-Advanced (LTE-A), a wireless LAN (also referred to as Wi-Fi (registered trademark), and other wireless communication protocols such as Bluetooth (registered trademark). The general-purpose communication I/F 7620 may be connected to a device (e.g. application server or control server) present on an external network (e.g. the Internet, a cloud network, or a company-specific network) via a base station or an access point, for example. Further, the general-purpose communication I/F 7620 may be connected with a terminal present in the vicinity of the vehicle (for example, a terminal of a driver, a pedestrian, or a shop or an machine type communication (MTC) terminal using a peer to peer (P2P) technology, for example.

The dedicated communication I/F 7630 is a communication I/F supporting a communication protocol formulated for use in a vehicle. For example, the dedicated communication I/F 7630 may implement standard protocols such as Wireless Access in Vehicle Environment (WAVE), which is a combination of IEEE 802.11p of a lower layer and IEEE 1609 of an upper layer, Dedicated Short Range Communications (DSRC), and a cellular communication protocol. Typically, the dedicated communication I/F 7630 performs V2X communication which is a concept including at least one of vehicle to vehicle communication, vehicle to infrastructure communication, vehicle to home communication, and vehicle to pedestrian communication.

The positioning unit 7640 receives, for example, global navigation satellite system (GNSS) signals (e.g. global positioning system (GPS) signals from GPS satellites) from GNSS satellites, executes positioning, and generates position information including the latitude, the longitude, and the altitude of the vehicle. Note that the positioning unit 7640 may specify the current position by exchanging signals with a wireless access point or may acquire position information from a terminal such as a mobile phone, a PHS or a smartphone having a positioning function.

The beacon reception unit 7650 receives radio waves or electromagnetic waves transmitted from a radio station or the like installed on a road, for example, and acquires information such as the current position, congestion, road closure or required time. Note that the function of the beacon reception unit 7650 may be included in the dedicated communication I/F 7630 described above.

The in-vehicle device I/F 7660 is a communication interface that mediates connection between the microcomputer 7610 and various in-vehicle devices 7760 present in the vehicle. The in-vehicle device I/F 7660 may establish a wireless connection using a wireless communication protocol such as wireless LAN, Bluetooth (registered trademark), near field communication (NFC), or wireless USB (WUSB). Furthermore, the in-vehicle device I/F 7660 may establish wired connection such as universal serial bus (USB), a high definition multimedia interface (HDMI), and mobile high-definition link (MHL) via a connection terminal (and a cable if necessary) (not illustrated). The in-vehicle devices 7760 may include at least one of a mobile device or a wearable device held by a passenger and an information device carried in or attached to the vehicle, for example. Furthermore, the in-vehicle devices 7760 may include a navigation device that performs route search to a desired destination. The in-vehicle device I/F 7660 exchanges control signals or data signals with these in-vehicle devices 7760.

The in-vehicle network I/F 7680 mediates communication between the microcomputer 7610 and the communication network 7010. The in-vehicle network I/F 7680 transmits and receives signals or the like in accordance with a predetermined protocol supported by the communication network 7010.

The microcomputer 7610 of the integrated control unit 7600 controls the vehicle control system 7000 in accordance with various programs on the basis of information acquired via at least one of the general-purpose communication I/F 7620, the dedicated communication I/F 7630, the positioning unit 7640, the beacon reception unit 7650, the in-vehicle device I/F 7660, and the in-vehicle network I/F 7680. For example, the microcomputer 7610 may calculate a control target value of the driving force generating device, the steering mechanism, or the braking device on the basis of acquired information regarding the inside and the outside of the vehicle and output a control command to the driving system control unit 7100. For example, the microcomputer 7610 may perform cooperative control aimed at implementing a function of an advanced driver assistance system (ADAS) including collision avoidance or impact mitigation of the vehicle, following travelling based on the inter-vehicle distance, travelling with a maintained vehicle speed, collision warning of the vehicle, lane deviation warning of the vehicle, or the like. Furthermore, the microcomputer 7610 may perform cooperative control aimed at automatic driving or the like that enables autonomously travelling without being dependent on the operation of the driver by controlling a driving force generating device, a steering mechanism, a braking device, or the like on the basis of acquired information of the surroundings of the vehicle.

The microcomputer 7610 may generate three-dimensional distance information among the vehicle and surrounding structures or objects such as people on the basis of information acquired via at least one of the general-purpose communication I/F 7620, the dedicated communication I/F 7630, the positioning unit 7640, the beacon reception unit 7650, the in-vehicle device I/F 7660, and the in-vehicle network I/F 7680 and generate local map information including information of the surroundings of the current position of the vehicle. In addition, the microcomputer 7610 may generate a warning signal by predicting danger such as collision of a vehicle, an approaching pedestrian or the like, or entry into a closed road on the basis of the acquired information. The warning signal may be, for example, a signal for generating alarm sound or turning on a warning lamp.

The audio image outputting unit 7670 transmits at least one of audio and image output signals to an output device capable of visually or audibly notifying a passenger or the outside of the vehicle of information. In the example of FIG. 11, as the output device, an audio speaker 7710, a display unit 7720, and an instrument panel 7730 are illustrated as an example. The display unit 7720 may include at least one of, for example, an onboard display and a head-up display. The display unit 7720 may have an augmented reality (AR) display function. The output device may be other devices other than the above such as a wearable device such as a headphone, a spectacles type display unit worn by a passenger, a projector, a lamp, or the like. In a case where the output device is a display device, the display device visually displays results obtained by various processing performed by the microcomputer 7610 or information received from other control units in various forms such as a text, an image, a table, and a graph. Alternatively, in a case where the output device is an audio output device, the audio output device audibly outputs an analog signal by converting an audio signal including reproduced audio data, acoustic data or the like into the analog signal.

Note that, in the example illustrated in FIG. 11, at least two control units connected via the communication network 7010 may be integrated as one control unit. Alternatively, each of the control units may include a plurality of control units. Further alternatively, the vehicle control system 7000 may include another control unit not illustrated. Also, in the descriptions above, a part or all of functions of any one of the control units may be performed by another control unit. That is, as long as transmission and reception of information is performed via the communication network 7010, predetermined arithmetic processing may be performed by any of the control units. Similarly, a sensor or a device connected to any of the control units may be connected to another control unit while a plurality of control units may transmit and receive detection information to and from each other via the communication network 7010.

Note that a computer program for implementing respective functions of the image processing block 32 according to the present embodiment described with reference to FIG. 1 can be implemented in any one of the control units or other components. Alternatively, it is also possible to provide a computer readable recording medium in which such a computer program is stored. The recording medium is, for example, a magnetic disk, an optical disk, a magneto-optical disk, a flash memory, or the like. Further alternatively, the above computer program may be delivered via, for example, a network without using a recording medium.

In the vehicle control system 7000 described above, the image processing block 32 according to the present embodiment described with reference to FIG. 1 can be applied to the integrated control unit 7600 of the application example illustrated in FIG. 11. For example, the toggle rate calculating units 51-0 to 51-4, the signal processing units 52-1 to 52-4, and the determination unit 53 of the image processing block 32 correspond to the microcomputer 7610, the storage unit 7690, and the in-vehicle network I/F 7680 of the integrated control unit 7600. For example, with the integrated control unit 7600 obtaining an average toggle rate of all bits of an image signal, it is possible to detect whether an error is occurring in the signal processing unit 52-N of the Nth stage. In addition, in implementing driving assist using images, it is possible that the integrated control unit 7600 detects occurrence of an error in real time, suppresses occurrence of malfunction in driving assist, and appropriately presents to the driver that driving assist has been stopped.

In addition, at least a part of the components of the image processing block 32 described with reference to FIG. 1 may be implemented in a module (for example, an integrated circuit module including one die) for the integrated control unit 7600 illustrated in FIG. 11. Alternatively, the image processing block 32 described with reference to FIG. 1 may be implemented by a plurality of control units of the vehicle control system 7000 illustrated in FIG. 11.

Note that the present disclosure may be as follows.

<1> A signal processing device, including:

a signal processing unit for sequentially processing input signals of digital signals;

a first toggle rate calculating unit for calculating a toggle rate of each of the input signals as a first toggle rate;

a second toggle rate calculating unit for calculating a toggle rate of a signal processed by the signal processing unit as a second toggle rate; and an error detecting unit for comparing a difference between the first toggle rate and the second toggle rate with a predetermined threshold value and detecting occurrence of an error depending on the comparison result.

<2> The signal processing device according to item <1>, in which both the first toggle rate calculating unit and the second toggle rate calculating unit both calculate, as the toggle rate, an average of ratios of the number of times of change of numerical values of respective digits of each of the digital signals for a predetermined number of clocks, the average being for all the digits.

<3> The signal processing device according to item <1> or <2>, in which each of the input signals is an image signal of binary data, and the first toggle rate calculating unit and the second toggle rate calculating unit both calculate an average value of toggle rates of respective bits for one frame as an average toggle rate of a preceding stage and an average toggle rate of a subsequent stage, respectively, of the signal processing unit.

<4> The signal processing device according to any one of items <1> to <3>, in which each of the input signals is an image signal of binary data, and the first toggle rate calculating unit and the second toggle rate calculating unit both calculate an average value of toggle rates of respective bits for one frame and further calculates an average value for all the bits as an average toggle rate of a preceding stage and an average toggle rate of a subsequent stage, respectively, of the signal processing unit.

<5> The signal processing device according to item <1> or <4>, in which each of the input signals is an image signal of binary data, and the error detecting unit detects occurrence of an error in the signal processing unit in a case where the difference between the first toggle rate and the second toggle rate is greater than an error threshold value which is a first threshold value.

<6> The signal processing device according to item <5>, in which a plurality of stages of signal processing units is connected in series, a toggle rate calculating unit is further provided between each pair of the signal processing units, a toggle rate calculating unit in a preceding stage of each of the signal processing unit corresponds to the first toggle rate calculating unit while a toggle rate calculating unit in a subsequent stage of the signal processing unit corresponds to the second toggle rate calculating unit, and the error detecting unit detects, for each of the plurality of signal processing units, occurrence of an error in the signal processing unit in a case where the difference between the first toggle rate and the second toggle rate is greater than the error threshold value and, when the occurrence of the error in the signal processing unit is detected, notifies a stage number of the signal processing unit in which the error has been detected.

<7> The signal processing device according to item <6>, in which a first toggle rate calculating unit in a foremost stage calculates a toggle rate of each of the input signals as an input toggle rate, and the error detecting unit sets the error threshold value to a second threshold value smaller than the first threshold value in a case where the input toggle rate is smaller than a predetermined threshold value, detects, for each of the plurality of signal processing units, occurrence of an error in the signal processing unit when the difference between the first toggle rate and the second toggle rate is greater than the error threshold value, and when the occurrence of the error in the signal processing unit is detected, notifies a stage number of the signal processing unit in which the error has been detected.

<8> The signal processing device according to item <6>, further including:

a plurality of imaging units for capturing the image signal, in which a plurality of stages of signal processing units is included in each of the plurality of imaging units, a plurality of stages of signal processing units is connected in series, the toggle rate calculating unit is further provided between each pair of the signal processing units, a toggle rate calculating unit in a preceding stage of each of the signal processing units corresponds to the first toggle rate calculating unit while a toggle rate calculating unit in a subsequent stage of the signal processing unit corresponds to the second toggle rate calculating unit, and the error detecting unit sets the error threshold value to a second threshold value smaller than the first threshold value in a case where the input toggle rate is smaller than a predetermined threshold value, detects, for each of the plurality of signal processing units, occurrence of an error in the signal processing unit when the difference between the first toggle rate and the second toggle rate is greater than the error threshold value and when a difference between the second toggle rates of the respective imaging units in a last stage of the plurality of signal processing units is larger than a predetermined threshold value, and when the occurrence of the error in the signal processing unit is detected, notifies a stage number of the signal processing unit in which the error has been detected.

<9> The signal processing device according to any one of claims 1 to 8, further including:

an assistance unit for assisting driving by controlling operation of a driving part included in a vehicle on the basis of the signal processing result of the signal processing unit; and a display unit for displaying control information of the vehicle, in which, in a case where an error is detected by the error detecting unit, the assistance unit stops assisting driving by controlling the operation of the driving part included in the vehicle base on the signal processing result of the signal processing unit.

<10> A signal processing method, including the steps of:
sequentially processing input signals of digital signals;
calculating a toggle rate of each of the input signals as a first toggle rate;
calculating a toggle rate of a signal processed by the signal processing unit as a second toggle rate; and
detecting occurrence of an error depending on a comparison result obtained by comparing a difference between the first toggle rate and the second toggle rate with a predetermined threshold value.

<11> A program for causing a computer to function as:
a signal processing unit for sequentially processing input signals of digital signals;
a first toggle rate calculating unit for calculating a toggle rate of each of the input signals as a first toggle rate;
a second toggle rate calculating unit for calculating a toggle rate of a signal processed by the signal processing unit as a second toggle rate; and
an error detecting unit for comparing a difference between the first toggle rate and the second toggle rate with a predetermined threshold value and detecting occurrence of an error depending on the comparison result.

REFERENCE SIGNS LIST

11 In-vehicle camera system
31, 31-1, 31-2 Image sensor
32, 32-1, 32-2 Image processing block
33 Subsequent stage LSI
51, 51-0 to 51-4, 51-0-1 to 51-4-1, 51-0-2 to 51-4-2 Toggle rate calculating unit
52, 52-1 to 52-4, 52-1-2 to 52-4-2 Signal processing unit
53, 53-1, 53-2 Determination unit

The invention claimed is:

1. A signal processing device, comprising:
a signal processing unit for sequentially processing input signals of digital signals;
a first toggle rate calculating unit for calculating a toggle rate of each of the input signals as a first toggle rate;
a second toggle rate calculating unit for calculating a toggle rate of a signal processed by the signal processing unit as a second toggle rate; and
an error detecting unit for comparing a difference between the first toggle rate and the second toggle rate with a predetermined threshold value and detecting occurrence of an error depending on a result of the comparison.

2. The signal processing device according to claim 1, wherein both the first toggle rate calculating unit and the second toggle rate calculating unit both calculate, as the toggle rate, an average of ratios of a number of times that numerical values of respective digits of each of the digital signals change during a predetermined number of clocks, the average being calculated across all digits.

3. The signal processing device according to claim 1, wherein each of the input signals is an image signal of binary data, and
the first toggle rate calculating unit and the second toggle rate calculating unit both calculate an average value of toggle rates of respective bits for one frame as an average toggle rate of a preceding stage and an average toggle rate of a subsequent stage, respectively, of the signal processing unit.

4. The signal processing device according to claim 1, wherein each of the input signals is an image signal of binary data, and
the first toggle rate calculating unit and the second toggle rate calculating unit both calculate an average value of toggle rates of respective bits for one frame and further calculates an average value for all the bits as an average toggle rate of a preceding stage and an average toggle rate of a subsequent stage, respectively, of the signal processing unit.

5. The signal processing device according to claim 1, wherein each of the input signals is an image signal of binary data, and
the error detecting unit detects occurrence of an error in the signal processing unit in a case where the difference between the first toggle rate and the second toggle rate is greater than an error threshold value which is a first threshold value.

6. The signal processing device according to claim 5, wherein a plurality of stages of signal processing units is connected in series,
a toggle rate calculating unit is further provided between each pair of the signal processing units,
a toggle rate calculating unit in a preceding stage of each of the signal processing units corresponds to the first toggle rate calculating unit while a toggle rate calculating unit in a subsequent stage of the signal processing unit corresponds to the second toggle rate calculating unit, and
the error detecting unit detects, for each of the plurality of signal processing units, occurrence of an error in the signal processing unit in a case where the difference between the first toggle rate and the second toggle rate is greater than the error threshold value and, when the occurrence of the error in the signal processing unit is detected, notifies a stage number of the signal processing unit in which the error has been detected.

7. The signal processing device according to claim 6,
wherein a first toggle rate calculating unit in a foremost stage calculates a toggle rate of each of the input signals as an input toggle rate, and the error detecting unit sets the error threshold value to a second threshold value smaller than the first threshold value in a case where the input toggle rate is smaller than a predetermined threshold value, detects, for each of the plurality of signal processing units, occurrence of an error in the signal processing unit when the difference between the first toggle rate and the second toggle rate is greater than the error threshold value, and when the occurrence of the error in the signal processing unit is detected, notifies a stage number of the signal processing unit in which the error has been detected.

8. The signal processing device according to claim 6, further comprising:
a plurality of imaging units for capturing the image signal of binary data, wherein a plurality of stages of signal processing units is included in each of the plurality of imaging units, the plurality of stages of signal processing units being connected in series, the toggle rate calculating unit is further provided between each pair of the signal processing units, a toggle rate calculating unit in a preceding stage of each of the signal processing units corresponds to the first toggle rate calculating unit while a toggle rate calculating unit in a subsequent stage of the signal processing unit corresponds to the second toggle rate calculating unit, and the error detecting unit sets the error threshold value to a second threshold value smaller than the first threshold value in a case where an input toggle rate is smaller than a predetermined threshold value, detects, for each of the plurality of signal processing units, occurrence of an error in the signal processing unit when the difference between the first toggle rate and the second toggle rate is greater than the error threshold value and when a difference between the second toggle rate of the respective imaging unit in a last stage of the plurality of signal processing units is larger than a predetermined threshold value, and when the occurrence of the error in the signal processing unit is detected, notifies a stage number of the signal processing unit in which the error has been detected.

9. The signal processing device according to claim 1, further comprising:
an assistance unit for assisting driving by controlling operation of a driving part included in a vehicle based on a signal processing result of the signal processing unit; and a display unit for displaying control information of the vehicle, wherein, in a case where an error is detected by the error detecting unit, the assistance unit stops assisting driving by controlling the operation of the driving part included in the vehicle based on the signal processing result of the signal processing unit.

10. A signal processing method, comprising the steps of:
sequentially processing input signals of digital signals;
calculating a toggle rate of each of the input signals as a first toggle rate;
calculating a toggle rate of a signal processed by a signal processing unit as a second toggle rate; and
detecting occurrence of an error depending on a comparison result obtained by comparing a difference between the first toggle rate and the second toggle rate with a predetermined threshold value.

11. A program for causing a computer to function as:
a signal processing unit for sequentially processing input signals of digital signals;
a first toggle rate calculating unit for calculating a toggle rate of each of the input signals as a first toggle rate;
a second toggle rate calculating unit for calculating a toggle rate of a signal processed by the signal processing unit as a second toggle rate; and
an error detecting unit for comparing a difference between the first toggle rate and the second toggle rate with a predetermined threshold value and detecting occurrence of an error depending on a result of the comparison.

* * * * *